United States Patent
Mizuguchi et al.

(10) Patent No.: US 9,152,696 B2
(45) Date of Patent: Oct. 6, 2015

(54) LINKAGE INFORMATION OUTPUT APPARATUS, LINKAGE INFORMATION OUTPUT METHOD AND COMPUTER-READABLE RECORDING MEDIUM

(75) Inventors: Hironori Mizuguchi, Tokyo (JP); Yukitaka Kusumura, Tokyo (JP); Yusuke Muraoka, Tokyo (JP); Dai Kusui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 34 days.

(21) Appl. No.: 13/583,805

(22) PCT Filed: Dec. 28, 2010

(86) PCT No.: PCT/JP2010/073724
§ 371 (c)(1),
(2), (4) Date: Sep. 10, 2012

(87) PCT Pub. No.: WO2011/111284
PCT Pub. Date: Sep. 15, 2011

(65) Prior Publication Data
US 2013/0007021 A1 Jan. 3, 2013

(30) Foreign Application Priority Data
Mar. 12, 2010 (JP) ................. 2010-055699

(51) Int. Cl.
*G06F 17/30* (2006.01)
(52) U.S. Cl.
CPC ...... *G06F 17/3061* (2013.01); *G06F 17/30882* (2013.01)
(58) Field of Classification Search
CPC .................. G06F 17/30882; G06F 17/3061

USPC ........................ 707/748, 750, 999.1
See application file for complete search history.

(56) References Cited

U.S. PATENT DOCUMENTS

| 6,285,999 B1 * | 9/2001 | Page ................................. 1/1 |
| 7,617,205 B2 * | 11/2009 | Bailey et al. ..................... 1/1 |

(Continued)

FOREIGN PATENT DOCUMENTS

JP 2008-250625 10/2008

OTHER PUBLICATIONS

International Search Report, PCT/JP2010/073724, Feb. 1, 2011.
(Continued)

*Primary Examiner* — Miranda Le
(74) *Attorney, Agent, or Firm* — Young & Thompson

(57) ABSTRACT

A linkage information output apparatus includes: a linkage information retrieval unit for acquiring, upon receiving source information, destination information linked with the source information, a frequency of occurrence of the source information, a frequency of occurrence of linked each of the destination information, and a frequency of occurrence of a link of the source information and each of the destination information from a linkage information accumulation unit; a recognition degree calculation unit calculating, based on each acquired frequency of occurrence, a recognition degree of the source information, a recognition degree of each acquired destination information, and a recognition degree of each link; and a high interest information narrowing unit selecting destination information to output from among each destination information based on a combination of two or more among a recognition degree of the source information, a recognition degree of the destination information, and a recognition degree of the link.

39 Claims, 13 Drawing Sheets

(56) References Cited

U.S. PATENT DOCUMENTS

| | | | |
|---|---|---|---|
| 7,739,209 B1 * | 6/2010 | Rajaraman | 706/20 |
| 7,996,393 B1 * | 8/2011 | Nanno et al. | 707/723 |
| 8,010,545 B2 * | 8/2011 | Stefik et al. | 707/758 |
| 8,041,711 B2 * | 10/2011 | Walker et al. | 707/723 |
| 8,176,041 B1 * | 5/2012 | Harinarayan et al. | 707/722 |
| 8,306,987 B2 * | 11/2012 | Ber et al. | 707/752 |
| 8,429,220 B2 * | 4/2013 | Wilkinson et al. | 709/202 |
| 2005/0154690 A1 * | 7/2005 | Nitta et al. | 706/46 |
| 2005/0222989 A1 * | 10/2005 | Haveliwala et al. | 707/3 |
| 2005/0259620 A1 * | 11/2005 | Igarashi et al. | 370/331 |
| 2006/0053135 A1 * | 3/2006 | Beaumont et al. | 707/101 |
| 2006/0109734 A1 * | 5/2006 | Fukuda et al. | 365/232 |
| 2006/0117002 A1 * | 6/2006 | Swen | 707/4 |
| 2006/0182034 A1 * | 8/2006 | Klinker et al. | 370/238 |
| 2006/0253289 A1 * | 11/2006 | Kymal et al. | 705/1 |
| 2007/0033275 A1 * | 2/2007 | Toivonen et al. | 709/224 |
| 2007/0110047 A1 * | 5/2007 | Kim | 370/389 |
| 2007/0271228 A1 * | 11/2007 | Querel | 707/3 |
| 2008/0071797 A1 * | 3/2008 | Thornton | 707/10 |
| 2008/0114753 A1 * | 5/2008 | Tal-Ezer | 707/5 |
| 2009/0164475 A1 * | 6/2009 | Pottenger | 707/10 |

OTHER PUBLICATIONS

Kazushi Nishimoto t al., "A study of a supporting system for generating ideas", Zenkoku Taikai Koen Ronbunshu, Dai 46 Kai Heisei 5 Nen Kenki (6), Information Processing Society of Japan, Mar. 1, 1993, pp. 283-to 284.

Kentaro Torisawa et al., "Jido Seisei sareta Kensaku Directory Torishiki no Genjo", The Association for Natural Language Processing Dai 14 Kai Nenji Taikai Happyo Ronbunshu, The Association for Natural language Processing, Mar. 17, 2008, pp. 729 to 732.

Megumi Ishii et al., "Evaluation of the Topic Prompt Extraction Method for a Message Stream", IPSJ SIG Notes, Information Processing Society of Japan, Sep. 30, 2005, vol. 2005, No. 94, pp. 33 to 40.

Shingo Otsuka et al., "One Consideration With Respect to a Detection method of a Related Term Using a Global-Area Web Access log", Journal of Information Processing Society of Japan, vol. 46. No. SIG8 (TOD26), pp. 82-92 (2005).

Yohei Noda et al., "Relational Analysis for Unpredictable Knowledge Discovery Among Wikipedia Categories", Society for the study of 20th Sematic Web and Ontology, SIG-SWO-A803-02, pp. 08-01 to pp. 08-04 (2008).

* cited by examiner

| SOURCE INFORMATION | DESTINATION INFORMATION | LINK FREQUENCY |
|---|---|---|
| NIPPON BUDOKAN | MOMOE YAMAGUCHI | 50 |
| NIPPON BUDOKAN | SELF-DEFENSE FORCES | 2 |
| NIPPON BUDOKAN | HIKARU MATSUNAGA | 20 |
| FUKUDAYA HOTEL | MOMOE YAMAGUCHI | 20 |
| SYLVAN MUSIC HALL | SEIJI OZAWA | 50 |
| ... | ... | ... |

T2

| INFORMATION | CATEGORY | FREQUENCY |
|---|---|---|
| NIPPON BUDOKAN | HALL | 5000 |
| MOMOE YAMAGUCHI | ENTERTAINER, SINGER | 10000 |
| SELF-DEFENSE FORCES | ORGANIZATION, GOVERNMENT | 200 |
| HIKARU MATSUNAGA | DIET MEMBER | 30 |
| SYLVAN MUSIC HALL | HALL | 500 |
| FUKUDAYA HOTEL | HOTEL | 30 |
| SEIJI OZAWA | CONDUCTOR, COMPOSER | 300 |
| ... | ... | ... |

FIG.5

| SOURCE INFORMATION | DESTINATION INFORMATION | EXISTENCE OF LINKAGE | UNPREDICTABILITY |
|---|---|---|---|
| MAJOR | MAJOR | MAJOR | NO |
| MAJOR | MAJOR | MINOR | YES(HIGH) |
| MAJOR | MINOR | MAJOR | NO |
| MAJOR | MINOR | MINOR | YES(MIDDLE) |
| MINOR | MAJOR | MAJOR | NO |
| MINOR | MAJOR | MINOR | YES(MIDDLE) |
| MINOR | MINOR | MAJOR | NO |
| MINOR | MINOR | MINOR | NO |

| SOURCE INFORMATION | DESTINATION INFORMATION | RELATION CONTENT | LINK FREQUENCY |
|---|---|---|---|
| NIPPON BUDOKAN | MOMOE YAMAGUCHI | CONCERT | 47 |
| NIPPON BUDOKAN | MOMOE YAMAGUCHI | LOCATION | 3 |
| NIPPON BUDOKAN | SELF-DEFENSE FORCES | CONCERT | 2 |
| NIPPON BUDOKAN | HIKARU MATSUNAGA | CURATOR | 20 |
| FUKUDAYA HOTEL | MOMOE YAMAGUCHI | LOCATION | 20 |
| SYLVAN MUSIC HALL | SEIJI OZAWA | DESIGN | 25 |
| SYLVAN MUSIC HALL | SEIJI OZAWA | LECTURE | 25 |
| ... | ... | ... | ... |

T2

| INFORMATION | CATEGORY | FREQUENCY |
|---|---|---|
| NIPPON BUDOKAN | HALL | 5000 |
| MOMOE YAMAGUCHI | ENTERTAINER | 10000 |
| SELF-DEFENSE FORCES | ORGANIZATION | 200 |
| HIKARU MATSUNAGA | DIET MEMBER | 30 |
| SYLVAN MUSIC HALL | HALL | 500 |
| FUKUDAYA HOTEL | HOTEL | 30 |
| SEIJI OZAWA | CONDUCTOR | 300 |
| ... | ... | ... |

| SOURCE INFORMATION | DESTINATION INFORMATION | LINK | RELATION CONTENT | UNPREDICTABILITY |
|---|---|---|---|---|
| MAJOR | MAJOR | MAJOR | MAJOR | NO |
| MAJOR | MAJOR | MAJOR | MINOR | UNPREDICTABILITY (HIGH) |
| MAJOR | MAJOR | MINOR | MAJOR | UNPREDICTABILITY (HIGH) |
| MAJOR | MAJOR | MINOR | MINOR | UNPREDICTABILITY (HIGH) |
| MAJOR | MINOR | MAJOR | MAJOR | NO |
| MAJOR | MINOR | MAJOR | MINOR | NO |
| MAJOR | MINOR | MINOR | MAJOR | UNPREDICTABILITY (MIDDLE) |
| MAJOR | MINOR | MINOR | MINOR | UNPREDICTABILITY (LOW) |
| MINOR | MAJOR | MAJOR | MAJOR | NO |
| MINOR | MAJOR | MAJOR | MINOR | NO |
| MINOR | MAJOR | MINOR | MAJOR | UNPREDICTABILITY (MIDDLE) |
| MINOR | MAJOR | MINOR | MINOR | UNPREDICTABILITY (LOW) |
| MINOR | MINOR | MAJOR | MAJOR | NO |
| MINOR | MINOR | MAJOR | MINOR | NO |
| MINOR | MINOR | MINOR | MAJOR | UNPREDICTABILITY (LOW) |
| MINOR | MINOR | MINOR | MINOR | NO |

FIG.12

| NAME | ADDRESS | LATITUDE-LONGITUDE | CATEGORY |
|---|---|---|---|
| NIPPON BUDOKAN | TOKYO-TO | 135.xxx, 32.xxx | HALL |
| SYLVAN MUSIC HALL | NAGANO-KEN | 135.xxx, 32.xxx | HALL |
| ... | ... | ... | ... |

LINKAGE INFORMATION OUTPUT APPARATUS, LINKAGE INFORMATION OUTPUT METHOD AND COMPUTER-READABLE RECORDING MEDIUM

TECHNICAL FIELD

The present invention relates to a linkage information output apparatus, a linkage information output method and a computer-readable recording medium, and in particular, to a linkage information output apparatus, linkage information output method and computer-readable recording medium which output, from source information, unpredictable information which attracts a user's interest.

BACKGROUND ART

A linkage information output apparatus is an apparatus which outputs information (hereinafter, also referred to as linkage information) linked with source information. Hereinafter, the linkage information is made to include a combination of source information and destination information, or a combination of source information, destination information and a relation content.
That is, the linkage information is the information which indicates linkage among keywords, documents, images, and voices. A relation content is a keyword and a sentence which indicate a type and characteristic feature of linkage.

It is important to select information which is unpredictable and attracts an interest as information presented to a user. Because, in the case of Web service etc., presenting information which attracts a user's interest promotes revisit of a user to a Web site, and links directly with the access number to the Web site. In addition, because, also in marketing, acquiring new information which the others cannot perceive easily will acquire new perceiving, and therefore, it is possible to be connected with new product development which is different from that of the others.

An example of a conventional linkage information output apparatus is disclosed in Shingo Otsuka, et al., "one consideration with respect to a detection method of a related term using a global-area web access log", Journal of Information Processing Society of Japan, vol. 46 No. SIG8 (TOD26), pp. 82-92 (2005) (Non-patent document 1). In Non-patent document 1, source information and destination information are keywords. When linkage information is presented, with a keyword of a linkage source as an input, the keyword having the highest access frequency among keywords which exist in Web pages accessed until now is outputted. Therefore, in the linkage information output apparatus disclosed in Non-patent Document 1, the object is to present the keyword most linked with the source information.

An example of a method of determining whether certain information is information which has unpredictability is disclosed in Yohei Noda, et al., "Relational analysis for unpredictable knowledge discovery among Wikipedia categories", Society for the study of 20th Semantic Web and Ontology, SIG-SWO-A803-02, pp. 08-01 to pp. 08-04 (2008) (Non-patent document 2). That is, in Non-patent document 2, a method of evaluating whether the information is unpredictable information based on a co-occurrence frequency of two categories is disclosed. Here, information belongs to a plurality of categories, and a co-occurrence frequency of two categories is the number of times where two categories belong to one of information concurrently. As for information Z which belongs concurrently to two categories with the category co-occurrence frequency small, it is assumed that an unpredictable knowledge over these two categories is included therein. In the case where the information Z is included in any two categories with the co-occurrence frequency small, this information Z is outputted as unpredictable information.

For example, assume that information "Taro Aso" belongs to a category "Prime Minister" and a category "Olympic athlete". At this time, in the case where the co-occurrence frequency of these two categories is low, the information "Taro Aso" is outputted as an unpredictable information.

PRIOR ART DOCUMENT

Non-Patent Document

Non-patent document 1: Shingo Otsuka, et al., "one consideration with respect to a detection method of a related term using a global-area web access log", Journal of Information Processing Society of Japan, vol. 46 No. SIG8 (TOD26), pp. 82-92 (2005).
Non-patent document 2: Yohei Noda, et al., "Relational analysis for unpredictable knowledge discovery among Wikipedia categories", Society for the study of 20th Semantic Web and Ontology, SIG-SWO-A803-02, pp. 08-01 to pp. 08-04 (2008).

DISCLOSURE OF THE INVENTION

Summary of the Invention

Problems to be Solved by the Invention

A linkage information output apparatus disclosed in Non-patent document 1 is made for the purpose of presenting the destination information most linked with the source information. Accordingly, since information which a user knows (known information) is presented and linkage information which attracts a user's interest can not be presented, there has been a problem that a click rate in a Web site is low. Even if the determination method is made to be inverted and information which is not linked is presented to the contrary, just only unknown linkage information that nobody knows does not attract a user's interest, and therefore, there has been a problem that the presented information is not selected either, and a click rate is low.

In addition, only by a technology disclosed in Non-patent document 2, likewise, unpredictable linkage information which attracts a user's interest cannot be presented. Because, it cannot be said to be unpredictable information, just because it belongs to a category where a co-occurrence frequency is low.

This reason will be described specifically.
For example, as a presenting method of linkage information, considered is a method in which an item is made to be source information and a category is made to be destination information. In this method, it is assumed that a co-occurrence frequency of a category "Prime Minister" and a category "Olympic athlete" is low, and there is an item "Taro Aso" belonging to these two categories. In this example, even if "Taro Aso" as source information and a category "Prime Minister" is outputted as destination information, unpredictability is not felt. On the other hand, if an "Olympic athlete" is outputted as destination information, the outputted linkage information will become information which attracts interest. Because, although it is known information that there exists a relation between source information "Taro Aso" and destination information "Prime Minister", it is unknown information that there exists a relation between the source information "Taro Aso" and the destination information "Olympic athlete".

As another presenting method of linkage information, there exists a method in which two categories are made to be source information and destination information, respectively, and an item is made to be a relation content. In the same way as mentioned above, in an example where there is an item "Taro Aso" belonging to these two categories, "Prime Minister" is outputted as the source information, "Olympic athlete" is outputted as the destination information and "Taro Aso" is outputted as the relation content. In this case, the outputted information will become the information which attracts interest. Because, although the source information itself and the destination information itself are known, it is unknown that there exists a relation between these two.

However, since in a technology disclosed in Non-patent document 2 the information with a co-occurrence frequency low is presented, an output will be carried out even if the source information itself and the destination information itself are what seldom appear. In the case where the source information itself and the destination information itself are unknown information, the outputted information will have been the information which is completely uninterested for a user, and therefore, a user does not feel unpredictability.

The present invention is accomplished for solving above-mentioned problems, and the object of the present invention is to provide a linkage information output apparatus, a linkage information output method and a computer-readable recording medium which are capable of outputting unpredictable information which attracts a user's interest.

Means for Solving the Problems

For solving the problems mentioned above, a linkage information output apparatus according to an aspect of the present invention is the linkage information output apparatus for outputting information linked with source information comprising: a linkage information retrieval unit which receives above-mentioned source information, and acquires a plurality of destination information linked with above-mentioned source information, a frequency of occurrence of above-mentioned source information, a frequency of occurrence of linked each above-mentioned destination information, and a frequency of occurrence of a link of above-mentioned source information and above-mentioned each destination information, from a linkage information accumulation unit provided inside or outside above-mentioned linkage information output apparatus;

a recognition degree calculation unit which, based on acquired each above-mentioned frequency of occurrence, calculates a recognition degree of above-mentioned source information, a recognition degree of acquired above-mentioned each destination information, and a recognition degree of each above-mentioned link; and a high interest information narrowing unit which selects one or more of above-mentioned destination information from among above-mentioned each destination information based on a combination of two or more among a recognition degree of above-mentioned source information, a recognition degree of above-mentioned destination information and a recognition degree of above-mentioned link, and outputs at least selected above-mentioned destination information.

For solving the problems mentioned above, a linkage information output method according to an aspect of the present invention is the linkage information output method for outputting information linked with source information, comprising the steps of: acquiring, on receiving above-mentioned source information, a plurality of destination information linked with above-mentioned source information, a frequency of occurrence of above-mentioned source information, a frequency of occurrence of linked each above-mentioned destination information, and a frequency of occurrence of a link of above-mentioned source information and above-mentioned each destination information, from a linkage information accumulation unit provided inside or outside above-mentioned linkage information output apparatus; calculating, based on acquired each above-mentioned frequency of occurrence, a recognition degree of above-mentioned source information, a recognition degree of acquired above-mentioned each destination information, a recognition degree of each above-mentioned link; and selecting one or more of above-mentioned destination information from among above-mentioned each destination information based on a combination of two or more among a recognition degree of above-mentioned source information, a recognition degree of above-mentioned destination information and a recognition degree of above-mentioned link, and outputting at least selected above-mentioned destination information.

For solving the problems mentioned above, a computer-readable recording medium according to an aspect of the present is the computer-readable recording medium having a linkage information output program used in a linkage information output apparatus for outputting information linked with source information recorded, and the linkage information output program makes a computer execute the steps of: acquiring, on receiving above-mentioned source information, a plurality of destination information linked with above-mentioned source information, a frequency of occurrence of above-mentioned source information, a frequency of occurrence of linked each above-mentioned destination information, and a frequency of occurrence of a link of above-mentioned source information and above-mentioned each destination information, from a linkage information accumulation unit provided inside or outside above-mentioned linkage information output apparatus; calculating, based on acquired each above-mentioned frequency of occurrence, a recognition degree of above-mentioned source information, a recognition degree of acquired above-mentioned each destination information, a recognition degree of each above-mentioned link; and selecting one or more of above-mentioned destination information from among above-mentioned each destination information based on a combination of two or more among a recognition degree of above-mentioned source information, a recognition degree of above-mentioned destination information and a recognition degree of above-mentioned link, and outputting at least selected above-mentioned destination information.

Effect of the Invention

According to the present invention, unpredictable information which attracts a user's interest can be outputted.

BRIEF DESCRIPTION OF THE DRAWINGS

FIG. 4 is a figure showing an example of accumulation information of a linkage information accumulation unit in a linkage information output apparatus according to the first embodiment of the present invention;

FIG. 5 is a figure showing an example of a rule of an unpredictability determination in the high interest information narrowing unit 54;

FIG. 7 is a figure indicating an example of accumulation information of a linkage information accumulation unit in the linkage information output apparatus according to the second embodiment of the present invention;

FIG. 9 is a figure indicating an example of a rule of an unpredictability determination in the high interest information narrowing unit 64;

FIG. 12 is a figure indicating an example of accumulation information of the position information accumulation unit in the position information display apparatus according to the third embodiment of the present invention.

BEST MODES FOR CARRYING OUT THE INVENTION

Figure 1:
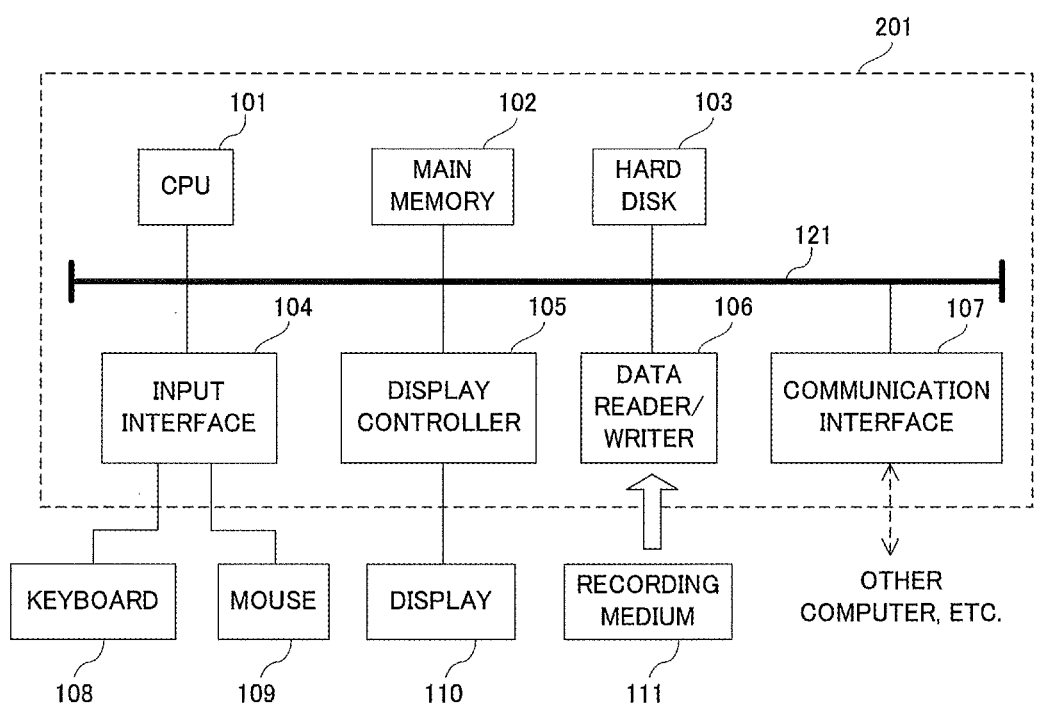
FIG. 1 is a schematic configuration diagram of a linkage information output apparatus according to a first embodiment of the present invention.

Hereinafter, an embodiment of the present invention will be described using the figures. It is noted that the same reference character will be given to the same or corresponding part in the figures, and thus the description will not be repeated.

First Embodiment

Summary

As mentioned above, whether, for a user, information is known information or unknown information is a very important factor with respect to whether it is the information which attracts a user's interest. Therefore, in the case where it is determined whether linkage information is known information or unknown information, it will become important to perform three types of determinations that are determination with respect to source information, determination with respect to destination information and determination with respect to existence of linkage. In a technology disclosed in Non-patent document 2, although the determination with respect to existence of linkage is performed, the determination with respect to source information and the determination with respect to destination information are not performed.

Here, it is made to be considered that whether information is known commonly or not can be substituted for whether it is known information or unknown information. That is, it is considered that known information is major information commonly known well, and unknown information is minor information not commonly known well. Therefore, it is considered that, based on a major degree and minor degree which source information and destination information have and a major degree and minor degree with respect to existence of linkage, i.e., based on a combination of these, destination information is narrowed down, and the information which is high in unpredictability and attracts a interest can be presented by presenting the narrowed destination information to a user. Hereinafter, existence of linkage is referred to as a "link" or a "relation". For example, that source information "Olympic athlete" and destination information "Prime Minister" have a link means that there exists linkage between "Olympic athlete" and "Prime Minister".

In a technology disclosed in the above-mentioned Non-patent documents 1 and 2, since a major degree and minor degree of a combination of two or more among source information, destination information and a link are not taken into consideration, there has been a problem that unpredictable information which attracts a user's interest cannot be presented.

In contrast to this, a linkage information output apparatus according to the first embodiment of the present invention comprises: a linkage information retrieval unit which has one or more of the source information as an input, and retrieves linkage information with respect to source information from specified databases, such as Web and Wikipedia®; a recognition degree calculation unit which calculates a major degree i.e. a recognition degree of the retrieved source information, a recognition degree of destination information, and a recognition degree of a link; and a high interest information narrowing unit which narrows-down unpredictable and interesting information based on recognition degrees of these of linkage information. The recognition degree calculation unit each calculates recognition degrees of source information, destination information and a link, and the high interest information narrowing unit narrows them down into unpredictable information in which a user has an interest based on a combination of two or more among these recognition degrees, and thereby, problems are solved.

The linkage information output apparatus according to the first embodiment of the present invention, typically, includes a computer which has a general-purpose architecture as a basic structure, and provides various functions described later by executing a program installed in advance. Generally, a program like this circulates in a state of being stored in a recording medium such as a flexible disk (Flexible Disk) and a CD-ROM (Compact Disk Read Only Memory), or via a network, etc. In the case where a general-purpose computer like this is used, in addition to an application for providing functions according to the first embodiment of the present invention, an OS (Operating System) for providing a fundamental function of the computer may be installed. In this case, a program according to the first embodiment of the present invention may be what executes processing by calling a required module in a prescribed order and/or timing within program modules provided as a part of the OS. That is, a program itself according to the first embodiment of the present invention may not include above modules, and processing may be executed by collaborating with the OS. Therefore, as a program according to the first embodiment of the present invention, it may have a configuration which does not include modules as mentioned above.

Furthermore, a program according to the first embodiment of the present invention may be provided with being incorporated in a part of other programs such as an OS. Also in this case, a program itself according to the first embodiment of the present invention does not include modules which other programs of the incorporation destination have as mentioned above, and the processing is executed by collaborating with the other programs. That is, as a program according to the first embodiment of the present invention, it may have a configuration which is incorporated in other programs like this.

Besides, alternatively, a part or all of functions which are provided by the program execution may be implemented as dedicated hardware circuitry.

Apparatus Configuration

FIG. 1 is a schematic configuration diagram of a linkage information output apparatus according to the first embodiment of the present invention. With reference to FIG. 1, a linkage information output apparatus 201 is an information processing apparatus such as a portable information terminal, a personal computer and a server, and comprises: a CPU (Central Processing Unit) 101 which is an arithmetic processing unit; a main memory 102 and a hard disk 103; an input interface 104; a display controller 105; a data reader/writer 106; and a communication interface 107. Each of these parts is connected in a manner where data communication is possible mutually via a bus 121.

The CPU101 carried out various calculations by reading out programs (code) stored in the hard disk 103 and writing to the main memory 102, and executing these in prescribed order.

The main memory 102 typically is a volatile storage device such as a DRAM (Dynamic Random Access Memory), and holds data etc. which indicate various arithmetic processing results in addition to programs read from the hard disk 103. The hard disk 103 is nonvolatile magnetic storage device, and various setting values etc. are stored in addition to the programs executed by the CPU101. Programs installed on this hard disk 103 circulate in a state of being stored in a recording medium 111 as described later. Besides, in addition to the hard disk 103, or in place of the hard disk 103, a semiconductor memory such as a flash memory may be adopted.

The input interface 104 intermediates data transmission between the CPU101 and a keyboard 108, a mouse 109 and an input unit such as a touch panel which is not illustrated. That is, the input interface 104 accepts an input from the outside, such as operation command given by a user operating the input unit.

The display controller 105 is connected with a display 110 which is a typical example of a display unit, and controls display on the display 110. That is, the display controller 105 displays to a user a result or the like of image processing by the CPU101. The display 110 is a LCD (Liquid Crystal Display) or a CRT (Cathode Ray Tube), for example.

The data reader/writer 106 intermediates data transmission between the CPU101 and the recording medium 111. That is, the recording medium 111 circulates in a state where programs etc. executed by the linkage information output apparatus 201 is stored, and the data reader/writer 106 reads the programs from this recording medium 111. The data reader/writer 106, in response to an internal command of the CPU101, writes a processing result, etc. in the linkage information output apparatus 201 to the recording medium 111. Besides, the recording medium 111 is, for example, a general-purpose semiconductor storage device such as a CF (Compact Flash) and a SD (Secure Digital), a magnetic storage medium such as a flexible disk (Flexible Disk), or an optical storage medium such as a CD-ROM (Compact Disk Read Only Memory).

The communication interface 107 intermediates data transmission between the CPU101 and a personal computer, a server device or the like. The communication interface 107, typically, has a communication function of Ethernet® or a USB (Universal Serial Bus). Besides, in place of a configuration where programs stored in the recording medium 111 are installed on the linkage information output apparatus 201, programs downloaded from a distribution server etc. via the communication interface 107 may be installed on the linkage information output apparatus 201.

To the linkage information output apparatus 201, other output apparatuses, such as a printer, may be connected as necessary.

Control Structure

Then, a control structure for providing various functions in a linkage information output apparatus 201 will be described.

Figure 2:
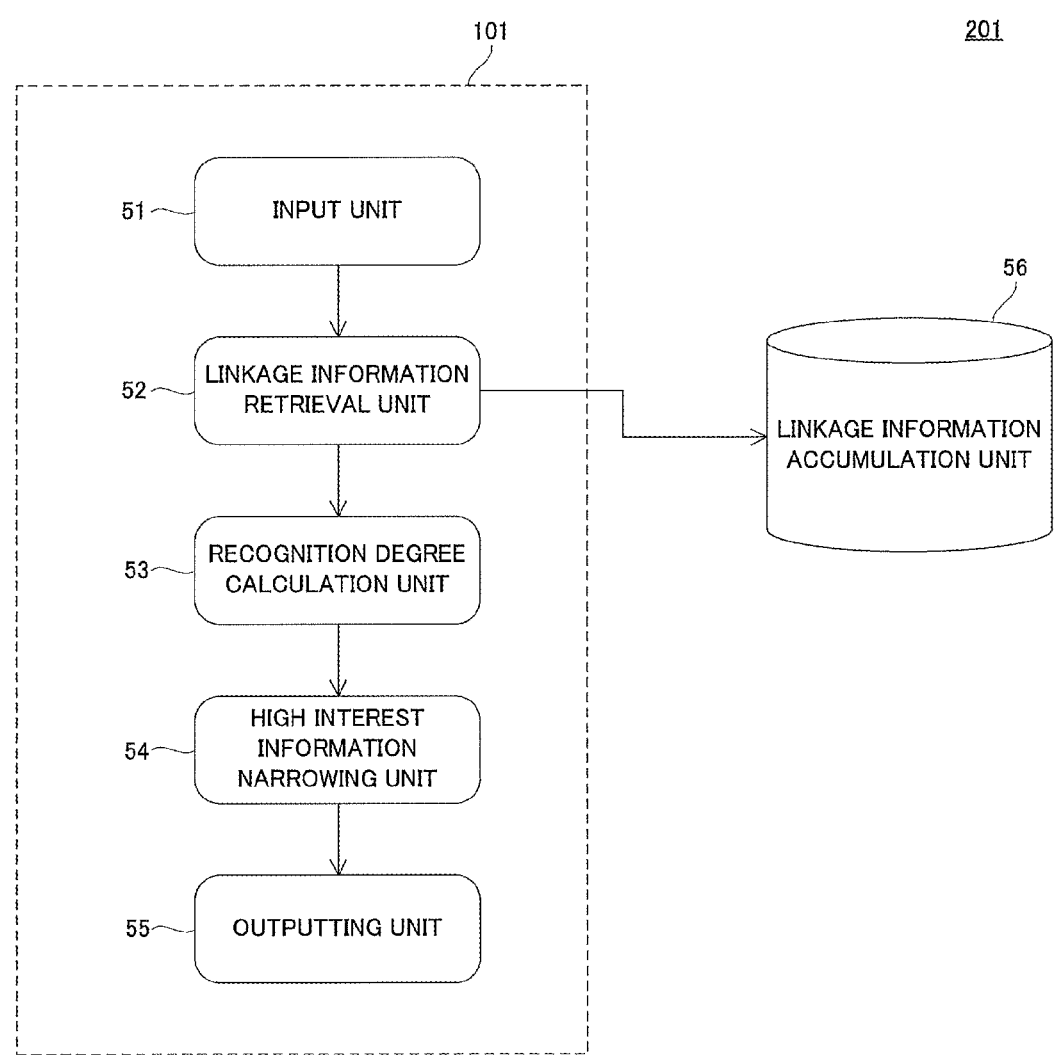
FIG. 2 is a block diagram showing a control structure which a linkage information output apparatus according to the first embodiment of the present invention provides.

FIG. 2 is a block diagram showing a control structure which a linkage information output apparatus according to the first embodiment of the present invention provides.

Each block of the linkage information output apparatus 201 shown in FIG. 2 is provided by reading out programs (code) etc. stored in the hard disk 103 and writing to the main memory 102, and making the CPU101 execute them. Besides, a part or all of modules shown in FIG. 2 may be provided by a firmware implemented in hardware. Alternatively, a part or all of control structures shown in FIG. 2 may be realized by dedicated hardware and/or a wiring circuit.

With reference to FIG. 2, the linkage information output apparatus 201 comprises the CPU101 and a linkage information accumulation unit 56. The CPU101, as its control structure, comprises: an input unit 51 to which one or more source information to be an input are inputted; a linkage information retrieval unit 52 which refers to the linkage information accumulation unit 56, and retrieves destination information etc. based on the source information; a recognition degree calculation unit 53 which calculates a recognition degree of source information, destination information and a link; a high interest information narrowing unit 54 which narrows down information interesting for a user based on a combination of two or more among recognition degrees of source information, destination information and a link; and an outputting unit 55 which outputs the narrowed linkage information. The linkage information accumulation unit 56 corresponds to the main memory 102 or the hard disk 103 shown in FIG. 1 for example. The outputting unit 55 outputs linkage information to the hard disk 103 or the display 110, for example, shown in FIG. 1.

Although it is common that the CPU101 is comprised of many units other than each part shown in FIG. 2, units which are not related to the present invention are not illustrated for simplifying descriptions.

In more details, the linkage information accumulation unit 56 holds source information, destination information, and a frequency of occurrence thereof (hereinafter, also referred to as only a frequency), i.e. the number of links. For example, in the linkage information accumulation unit 56, a hypertext document is accumulated, and a certain hypertext document and its hyperlink destination document may be made to be source information and destination information respectively. A feature word of a certain hypertext document and a feature word of a hyperlink destination document may be made to be source information and destination information respectively.

The input unit 51 accepts one or more of source information, and delivers them to the linkage information retrieval unit 52. The linkage information retrieval unit 52 accepts one or more of source information from the input unit 51, and refers to the linkage information accumulation unit 56, and acquires linkage information including source information in agreement with the accepted source information, and delivers them to the recognition degree calculation unit 53. The linkage information includes source information, destination information and a frequency of them.

The recognition degree calculation unit 53 accepts linkage information which is a search result from the linkage information retrieval unit 52, and calculates each recognition degrees of source information, destination information and a link. Here, the recognition degree calculation unit 53 calculates, as a recognition degree, a ratio of a frequency of each of source information, destination information and a link to frequencies of the whole of the linkage information accumulation unit 56, or a ratio of a frequency of each destination information, source information and a link to frequencies of the whole search results, or the like.

The high interest information narrowing unit 54 narrows down linkage information based on each recognition degree calculated by the recognition degree calculation unit 53. Here, in the case where every recognition degree of source information, destination information and a link are high, it is considered that such linkage information is ordinary linkage information which everyone knows. On the contrary, in the case where every recognition degree is low, it is considered that such information is the information which a user does not know or not wish to know very much. In the case where a recognition degree of at least one of destination information and source information is high and a recognition degree of a link (existence of linkage) is low, it is considered that these of information are ones where a user knows at least one of destination information and source information, but a relation between them is unpredictable for a user.

That is, the high interest information narrowing unit 54, in the case where a recognition degree of both source information and destination information is high and a recognition degree of a link is low, determines that such information is one having unpredictability. Further, the high interest information narrowing unit 54, in the case where a recognition degree of one of source information and destination information is high and the other is low and a recognition degree of a link is low, determines that such information is one having unpredictability, and in the case of the other, determines that there is no unpredictability. In addition, the high interest information narrowing unit 54 may include a degree of unpredictability in these rules as described later.

The outputting unit 55 accepts linkage information from the high interest information narrowing unit 54, and outputs the accepted linkage information.

Operation

Then, an operation of a linkage information output apparatus according to the first embodiment of the present invention will be described using the figures In the first embodiment of the present invention, a linkage information output method according to a first embodiment of the present invention is performed by making the linkage information output apparatus 201 operate. Therefore, a description of the linkage information output method according to the first embodiment of the present invention is substituted by an operation description of the following linkage information output apparatus 201. In the following description, FIG. 2 is referred to suitably.

Figure 3:
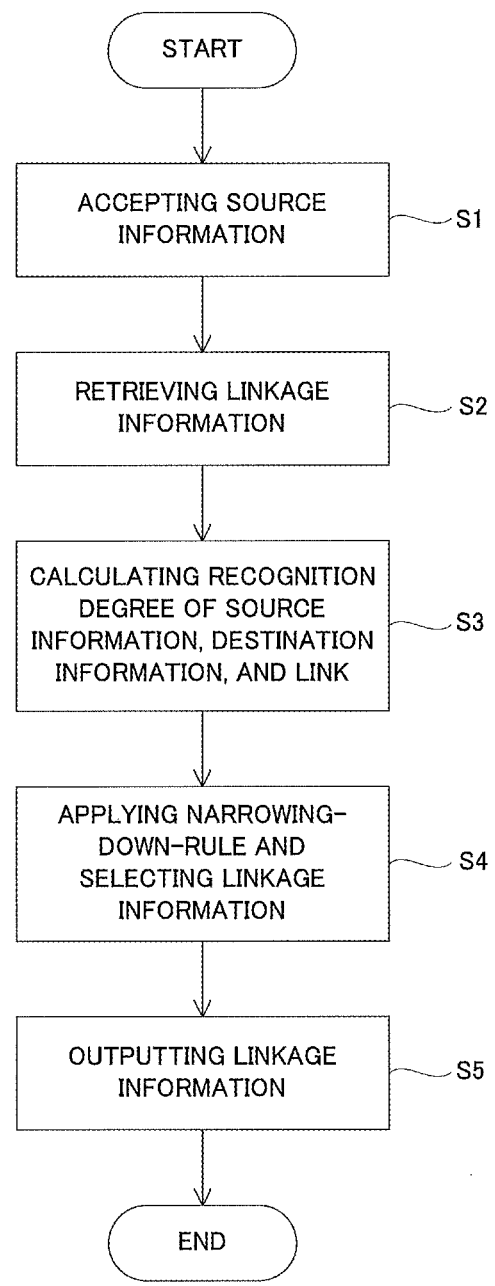
FIG. 3 is a flow chart showing operation procedures in the case where a linkage information output apparatus according to the first embodiment of the present invention performs linkage information output processing.

FIG. 3 is a flow chart showing operation procedures in the case where a linkage information output apparatus according to the first embodiment of the present invention performs linkage information output processing.

FIG. 4 is a figure showing an example of accumulation information of a linkage information accumulation unit in the linkage information output apparatus according to the first embodiment of the present invention.

With reference to FIG. 4, the linkage information accumulation unit 56 has tables T1 and T2. In table T1, linkage information is accumulated, and one record shows one of linkage information. Each of linkage information on the table T1 is made up of source information, destination information, and a link frequency. In the table T2, a frequency of occurrence of actual information corresponding to source information and destination information is accumulated, and one record indicates one of information.

Besides, contents indicated in FIG. 4 may be examples, and source information and destination information may be ID of each of information. Alternatively, hypertext documents may be accumulated, and a characteristic word included in a hyperlink source in the hypertext documents may be made to be source information, and a characteristic word included in a hypertext of a hyperlink destination may be made to be destination information, and a frequency of occurrence of each word may be made to be a frequency of occurrence of source information and destination information. In addition, hypertext documents may be accumulated, and a category may be made to be associated with these hypertext documents, and in the case where there exists a link from a hypertext document of a certain category to a hypertext document of another category, this link may be made to be linkage information, and the number of hypertext documents within the category may be made to be a frequency of occurrence. That is, the linkage information accumulation unit 56 may accumulate source information, destination information and data by which a frequency of these can be calculated, and information and data by which a frequency thereof can be calculated.

With reference to FIG. 3, first, the input unit 51 accepts one or more of source information. For example, "Nippon Budokan Hall" is inputted (Step S1).

Then, the linkage information retrieval unit 52 retrieves linkage information (Step S2). In more details, the linkage information retrieval unit 52 refers to the linkage information accumulation unit 56, and acquires a record in which source information given from the input unit 51 exists, and returns it as a search result. In the case where accumulation contents of the linkage information accumulation unit 56 are examples indicated in FIG. 4, the linkage information retrieval unit 52 returns search results that the number of links of linkage information ("Nippon Budokan Hall" and "Momoe Yamaguchi") is 50, and the number of links of linkage information ("Nippon Budokan Hall" and "Self-Defense Forces") is 2, and the number of links of linkage information ("Nippon Budokan Hall" and "Hikaru Matsunaga") is 20, and a frequency of information "Nippon Budokan Hall" is 5000, and a frequency of information "Momoe Yamaguchi" is 10000, and a frequency of information "Self-Defense Forces" is 200, and a frequency of information "Hikaru Matsunaga" is 30 (Step S2).

Then, the recognition degree calculation unit 53 calculates a recognition degree of each of source information, destination information and a link with respect to each of linkage information (Step S3). Here, the more a frequency of each of source information, destination information and a link will become, the higher a value of a recognition degree will become. For example, the recognition degree calculation unit 53, calculates as a recognition degree: a relative frequency to the frequency total of the whole linkage information i.e. all the linkage information accumulated in the linkage information accumulation unit 56; a relative frequency to the frequency total of all of linkage information of search results by the linkage information retrieval unit 52; a relative difference against the average frequency of occurrence of all of linkage information accumulated in the linkage information accumulation unit 56; or a appearance probability in an estimated distribution of the whole linkage information. Alternatively, the recognition degree calculation unit 53, using each category of source information and destination information, calculates an appearance probability within a category as a recognition degree of each of source information and destination information, and calculates an appearance probability between categories as a recognition degree of a link (Step S3).

Specifically, The recognition degree calculation unit 53, for example, calculates a relative difference against an average frequency of occurrence in accordance with each following equation as a recognition degree of source information A, a recognition degree of destination information B and a recognition degree of the links (A, B):

recognition degree(source information $A$)=frequency (source information $A$)−average frequency of occurrence(source information);

recognition degree(destination information $B$)=frequency(destination information $B$)−average frequency of occurrence(destination information); and recognition degree(link($A,B$))=frequency(link($A,B$))− average frequency of occurrence(link).

Then, the recognition degree calculation unit 53, if the calculated recognition degree is not less than a prescribed threshold value set in advance, determines that the information is high in a recognition degree, and is major.

Besides, there may be provided a configuration such that the recognition degree calculation unit 53, in advance, has calculated an average frequency of occurrence to be stored. Here, suppose that an average frequency of occurrence of each of source information and destination information is 150 and an average frequency of occurrence of a link is 20.

In this case, a recognition degree of linkage information ("Nippon Budokan Hall", "Momoe Yamaguchi") is calculated as follows:

recognition degree(Nippon Budokan Hall)=5000− 150=4850;

recognition degree(Momoe Yamaguchi)=10000− 150=9850; and recognition degree(link(Nippon Budokan Hall,Momoe Yamaguchi))=50−20=30.

A recognition degree of linkage information ("Nippon Budokan Hall", "Self-Defense Forces") is calculated as follows:

recognition degree(Nippon Budokan Hall)=5000− 150=4850;

recognition degree(Self-Defense Forces)=200− 150=50; and recognition degree(link(Nippon Budokan Hall,Self-Defense Forces))=2−20=−18.

A recognition degree of linkage information ("Nippon Budokan Hall", "Hikaru Matsunaga") is calculated as follows:

recognition degree(Nippon Budokan Hall)=5000− 150=4850;

recognition degree(Hikaru Matsunaga)=30−150=− 120; and recognition degree(link(Nippon Budokan Hall,Hikaru Matsunaga))=20−20=0.

In the case of using distribution of linkage information, calculation is carried out as follows. First, a model is considered to be binomial distribution. When a probability variable follows binomial distribution with parameters n and p, it is described as $X\sim B(n, p)$. Probability $P(X)$ where successes of just k times are acquired is indicated as follows:

$$P(X)=B(n,p,k)=nCk \times p^{\wedge}k \times (1-p)^{\wedge}(1-k)$$

where, $\wedge$ is a symbol of operation showing exponentiation.

Source information is considered to be a probability variable, and the whole frequency of source information is made to be n, and a probability that specific source information will appear is made to be p, and a frequency of the specific source information is made to be k. Here, the whole frequency n of source information is a total of frequencies of all of source information accumulated in the linkage information accumulation unit 56. In the linkage information accumulation unit 56 indicated in FIG. 4, a total of 5000, 30, 500, and —, which are frequencies of "Nippon Budokan Hall", "Fukudaya hotel", "Sylvan music hall", . . . , will become the whole frequency of source information.

Here, suppose that a frequency of occurrence of specific source information A is made to be nA. In this case, a probability that a frequency of occurrence of the source information A is not more than nA can be calculated as follows using the above-mentioned distribution.

$$\Sigma\_(k=0,nA)P(X)=\Sigma\_(k=0,nA)\{nCk \times p^{\wedge}k \times (1-p)^{\wedge}(1-k)\}$$

This probability value is made to be a recognition degree of source information. In this case, it is estimated that a parameter p is a probability that the source information will appear. That is, the parameter p will become a following value:

$p$=average frequency of source information/the whole frequency of source information.

A recognition degree of destination information is also calculated in the same way as source information. Then, a recognition degree of a link is calculated as follows.

That is, a link is considered to be a probability variable, the whole frequency of links is made to be n, a probability that a link will appear is made to be p, and a frequency of a specific link (A, B) is made to be kAB. Here, the whole frequency n of links is a total of frequencies of all links accumulated in the linkage information accumulation unit 56. In the linkage information accumulation unit 56 indicated in FIG. 4, a total of 50, 2, 20, . . . , which are frequencies of ("Nippon Budokan Hall", "Momoe Yamaguchi"), ("Nippon Budokan Hall", "Self-Defense Forces"), ("Nippon Budokan Hall", "Hikaru Matsunaga"), . . . , will become the whole frequency of links.

Here, suppose that a frequency of occurrence of a specific link (A, B) is made to be nAB. In this case, a probability that a frequency of occurrence of a link (A, B) is not more than nAB is calculated as follows:

$$\Sigma\_(k=0,nAB)P(X)=\Sigma\_(k=0,nAB)\{nCk\times p^{\hat{}}k\times(1-p)^{\hat{}}(1-k)\}.$$

Here, the whole frequency of links is calculated by the whole frequency of source information×the whole frequency of destination information.

A parameter p is calculated as follows:

$p$=a frequency of occurrence of a link/the whole frequency of links.

The recognition degree calculation unit 53, if a recognition degree acquired by performing the above calculations is not less than a prescribed threshold value, determines that the information is high in a recognition degree, and is major.

Calculation of Recognition Degree Using Category

Here, generally, the number of a link in a Web page is 1 in many cases, and a frequency of a relation (link) between source information and destination information is 1 in many cases. So that a recognition degree of a link may be appropriately calculated even in such a case, a recognition degree of a link also can be calculated using category information in the linkage information output apparatus according to the first embodiment of the present invention. That is, a link is considered for every category, and a recognition degree of an inter-category-link is calculated.

First, with respect to a category of source information and a category of destination information, a distribution is calculated in the same way as the method of source information as mentioned above.

Then, calculated is a recognition degree between a category CA of source information A and a category CB of destination information B, which form a link (A, B). In the case where the source information A or the source information B belongs to a plurality of categories, calculated is an average value, the maximum or the minimum of recognition degrees of a plurality of inter-category-links.

That is, a recognition degree of an inter-category-link of the category CA and the category CB is calculated as follows:

$$\Sigma\_(k=0,nCAB)P(X)=\Sigma\_(k=0,nCAB)\{nCk\times p^{\hat{}}k\times(1-p)^{\hat{}}(1-k)\}$$

Where, nCAB is made to be a frequency where a link exists between the category CA and the category CB. n denotes the whole frequency of links of the category CA and the category CB, i.e. (the number of source information belonging to the category CA)×(the number of destination information belonging to the category CB).

A parameter p is calculated as follows:

$p$=the number with which links exist among categories/the whole frequency of links among all the categories.

Then, the high interest information narrowing unit 54 accepts a recognition degree from the recognition degree calculation unit 53, and determines whether there exists unpredictability in the linkage information by referring to a rule incorporated inside the high interest information narrowing unit 54 itself (Step S4).

FIG. 5 is a figure showing an example of a rule of an unpredictability determination in the high interest information narrowing unit 54.

With reference to FIG. 5, this rule indicates whether there exists unpredictability for every combination of whether each of source information, destination information and a link is major.

In examples indicated in FIG. 5, in the case where all of source information, destination information, and a link are major, it is determined that there is no unpredictability. Because, possibility that it is already known information is high. On the contrary, in the case where all of source information, destination information, and a link are minor, also, it is determined that there is no unpredictability. Because, even if information which is not known at all is presented, the meaning cannot be guessed.

That is, the high interest information narrowing unit 54, in the case where either or both of source information and destination information are major, and a link is minor, determines that a combination of source information and destination information, i.e. linkage information has unpredictability.

In the case where the rule indicated in FIG. 5 is applied, it is determined that the linkage information ("Nippon Budokan Hall", "Momoe Yamaguchi") does not have unpredictability since source information, destination information and a link are all major and are information which everyone knows.

With respect to the linkage information ("Nippon Budokan Hall", "Self-Defense Forces"), since source information is major, destination information is also major and a link is minor, there existing a relation is unpredictable though each information is known. Therefore, the high interest information narrowing unit 54 determines that the linkage information has high unpredictability, and selects it as information which is to be outputted.

With respect to the linkage information ("Nippon Budokan Hall", "Hikaru Matsunaga"), source information is major, destination information is minor, and a link is minor. Therefore, the high interest information narrowing unit 54 determines that the unpredictability of the linkage information is middle level, and selects it as information which is to be outputted.

Then, the high interest information narrowing unit 54 gives the outputting unit 55 information which indicates that the unpredictability of linkage information ("Nippon Budokan Hall", "Self-Defense Forces") is high, and that the unpredictability of linkage information ("Nippon Budokan Hall", "Hikaru Matsumoto") is middle level (Step S4).

Finally, the outputting unit 55 accepts the information from the high interest information narrowing unit, and outputs this (Step S5). For example, the outputting unit 55 displays linkage information ("Nippon Budokan Hall", "Self-Defense Forces") and linkage information ("Nippon Budokan Hall", "Hikaru Matsumoto") in the display 110.

By the way, there was a problem that unpredictable information which attracts a user's interest could not be presented with technologies disclosed in Non-patent documents 1 and 2.

In contrast to this, in the linkage information output apparatus according to the first embodiment of the present invention, the linkage information retrieval unit 52, upon receiving source information from the input unit 51, acquires a plurality of destination information linked with source information, a frequency of occurrence of source information, a frequency of occurrence of linked each destination information, and a frequency of occurrence of a link between source information and each destination information, from the linkage information accumulation unit 56. The recognition degree calculation unit 53 calculates, based on acquired each frequency of occurrence, a recognition degree of source information, a recognition degree of acquired each destination information, and a recognition degree of each link. Then, the high interest information narrowing unit 54, based on a recognition degree of source information, a recognition degree of destination information and a recognition degree of a link, selects one or more of destination information from among destination information, and outputs them to the outputting unit 55.

In this manner, a recognition degree of source information, destination information and a link are used, and thereby, it is possible to perform narrowing down from a plurality of linkage information to the unpredictable high interest information, and therefore, it becomes possible to present the unpredictable information which attracts a user's interest.

In the linkage information output apparatus according to the first embodiment of the present invention, as indicated in FIG. 5, from among destination information, the high interest information narrowing unit 54 selects destination information where at least one of a recognition degree of source information and a recognition degree of destination information is higher than a prescribed threshold value, i.e. major and where a recognition degree of a link is lower than a prescribed threshold value, i.e. minor, as unpredictable information.

By means of a configuration like this, the unpredictable high interest information can be appropriately narrowed down from a plurality of linkage information.

In the linkage information output apparatus according to the first embodiment of the present invention, the high interest information narrowing unit 54, further, as indicated in FIG. 5, from among selected destination information, selects destination information where a recognition degree of source information and a recognition degree of destination information become higher than a prescribed threshold value, and where a recognition degree of a link becomes lower than a prescribed threshold value, as destination information where unpredictability is high in a high level.

By means of a configuration like this, it becomes possible to present a user further the unpredictable high interest information, and a user's degree of satisfaction can be enhanced further.

In the linkage information output apparatus according to the first embodiment of the present invention, the recognition degree calculation unit 53, with respect to object information for which a recognition degree is to be calculated among source information and acquired each destination information and each link, acquires a total of frequencies of occurrence corresponding to the object information among a total of frequencies of occurrence of all of source information accumulated in the linkage information accumulation unit 56, a total of frequencies of occurrence of all of destination information accumulated in the linkage information accumulation unit 56, and a total of frequencies of occurrence of all the links accumulated in the linkage information accumulation unit 56. Specifically, the recognition degree calculation unit 53 acquires, via the linkage information retrieval unit 52, frequencies of occurrence of all of source information, all of destination information and all the links, which are accumulated in the linkage information accumulation unit 56, and calculates, from these acquired frequencies of occurrence, a total of frequencies of occurrence of source information, and a total of frequencies of occurrence of destination information, and a total of frequencies of occurrence of a link. Then, the recognition degree calculation unit 53 estimates an appearance probability distribution from the total of the acquired frequencies of occurrence, and using the estimated appearance probability distribution, calculates an appearance probability of the object information as a recognition degree of the object information.

By means of a configuration like this, a recognition degree is appropriately calculated, and thereby, high interest information can be narrowed down in a higher accuracy.

In the linkage information output apparatus according to the first embodiment of the present invention, the recognition degree calculation unit 53 calculates an average frequency of occurrence from the total of frequencies of occurrence acquired as mentioned above, and calculates a difference between the calculated average frequency of occurrence and the frequency of occurrence of object information as a recognition degree of the object information.

By means of a configuration like this, a recognition degree is appropriately calculated, and thereby, high interest information can be narrowed down in a higher accuracy.

In the linkage information output apparatus according to the first embodiment of the present invention, the linkage information retrieval unit 52, further, acquires category information of source information and category information of linked each destination information from the linkage information accumulation unit 56. Then, the recognition degree calculation unit 53 estimates an appearance probability distribution from a total of frequencies of occurrence of links between categories of source information and destination information corresponding to an object link which is the link of which recognition degree is to be calculated, and using an estimated appearance probability distribution, calculates an appearance probability of the link between categories as a recognition degree of the object link.

By means of a configuration like this, a recognition degree of a link is appropriately calculated from a viewpoint of a category, and thereby, high interest information can be narrowed down in a higher accuracy.

In the linkage information output apparatus according to the first embodiment of the present invention, the recognition degree calculation unit 53, in the case where at least one of source information and destination information which correspond to an object link belongs to a plurality of categories, an average value, the maximum or the minimum of a recognition degree calculated with respect to each category is made to be a recognition degree of the object link.

By means of a configuration like this, a recognition degree can be calculated appropriately even in the case where a plurality of categories exist.

Besides, in descriptions of FIG. 5, the high interest information narrowing unit 54 is made to be configured so as to select one or more of destination information from among destination information based on a recognition degree of source information, a recognition degree of destination information and a recognition degree of a link, but is not limited to this. The high interest information narrowing unit 54 may be configured so as to select one or more of destination information from among destination information based on a combination of two or more among a recognition degree of source information, a recognition degree of destination information and a recognition degree of a link. In this case, the high interest information narrowing unit 54 selects any two of source information, destination information and a link, and selects, for example, destination information where a recognition degree of one of the selected ones becomes higher than a prescribed threshold value, and a recognition degree of the other becomes lower than a prescribed threshold value, from among destination information.

For example, the high interest information narrowing unit 54 selects source information and destination information, and in the case where source information is major, and destination information is minor, determines that this linkage information has the unpredictability. In addition, the high interest information narrowing unit 54 selects source information and a link, and in the case where source information is major and a link is minor, determines that this linkage information has the unpredictability. The high interest information narrowing unit 54 selects destination information and a link, and in the case where destination information is major and a link is minor, determines that this linkage information has the unpredictability.

The linkage information output apparatus according to the first embodiment of the present invention is made to be configured so as to comprise the linkage information accumulation unit 56, but is not limited to this. It may be configured so that the linkage information accumulation unit 56 may be provided outside the linkage information output apparatus 201.

In the linkage information output apparatus according to the first embodiment of the present invention, the outputting unit 55 is made to be configured so as to output source information and destination information as linkage information, but is not limited to this. The outputting unit 55 may be configured so as to output at least destination information, and in addition to source information and destination information, may be configured so as to output other information further.

In the linkage information output apparatus according to the first embodiment of the present invention, the recognition degree calculation unit 53 is made to be configured so as to acquire, via the linkage information retrieval unit 52, frequencies of occurrence of all of source information, all of destination information and all the links which are accumulated in the linkage information accumulation unit 56, for example, and to calculate, from these acquired frequencies of occurrence, a total of frequencies of occurrence of source information, a total of frequencies of occurrence of destination information and a total of frequencies of occurrence of a link, but is not limited to this. It may be configured so that the linkage information accumulation unit 56 may store a total of frequencies of occurrence of source information, a total of frequencies of occurrence of destination information, and a total of frequencies of occurrence of links, and that the recognition degree calculation unit 53 may acquire a total of frequencies of occurrence of these from the linkage information accumulation unit 56 via the linkage information retrieval unit 52.

A threshold value for the recognition degree calculation unit 53 to determine a major or a minor of linkage information may be common to source information, destination information and a link, and may be a different value.

In the linkage information output apparatus according to the first embodiment of the present invention, the recognition degree calculation unit 53 is made to be configured so as to calculate a recognition degree of a link using category information, but is not limited to this. The recognition degree calculation unit 53 may calculate a recognition degree of a category of source information further, and may calculate a recognition degree of a category of destination information further.

In more details, the linkage information retrieval unit 52 acquires category information of source information and category information of linked each destination information from the linkage information accumulation unit 56. Then, the recognition degree calculation unit 53, with respect to the object information for which a recognition degree is to be calculated among source information and acquired each destination information, acquires a total of frequencies of occurrence corresponding to the object information among a total of frequencies of occurrence of a category of all of source information accumulated in the linkage information accumulation unit 56, and a total of frequencies of occurrence of a category of all of destination information accumulated in the linkage information accumulation unit 56. The recognition degree calculation unit 53 estimates an appearance probability distribution from the acquired total of frequencies of occurrence, and using the estimated appearance probability distribution, calculates an appearance probability of a category of the object information as a recognition degree of the object information. Alternatively, the recognition degree calculation unit 53 calculates an average frequency of occurrence from the acquired total of frequencies of occurrence, and calculates a difference between the calculated average frequency of occurrence and a frequency of occurrence of a category of the object information as a recognition degree of the object information.

By means of a configuration like this, from a viewpoint of a category, a recognition degree of source information and a recognition degree of destination information can be appropriately calculated, and therefore, high interest information can be narrowed down in a higher accuracy.

Besides, in this case, the recognition degree calculation unit 53, in the case where the object information belongs to a plurality of categories, an average value, the maximum or the minimum of recognition degrees calculated with respect to each category is made to be a recognition degree of the object information. By means of a configuration like this, even in the case where a plurality of categories exist, a recognition degree can be appropriately calculated.

Next, an other embodiment of the present invention will be described using the figures. It is noted that the same reference character will be is given to the same or corresponding part in the figures, and thus the description will not be repeated.

Second Embodiment

The present embodiment relates to a linkage information output apparatus with a relation content added as a reference of unpredictability determination as compared with linkage information output apparatus according to the first embodiment. Contents other than those described in the following are the same as those of a linkage information output apparatus according to the first embodiment Summary In the linkage information output apparatus according to the first embodiment of the present invention, an attention has been focused on source information, destination information and a link, but in addition to these, a relation content is also important. For example, a geographical place and a person linked with the place are considered. Even if source information "sylvan music hall" and destination information "Seiji Ozawa" are outputted as linkage information, it is not so unpredictable. Because, this source information is a concert hall, and this destination information is a conductor, and therefore, existence of linkage is known because doing a concert can be guessed. However, if the relation content is "Seiji Ozawa has designed the sylvan music hall", this is information which has high unpredictability and attracts interest. Because, the relation content differs from guessed known information.

In technologies disclosed in the above-mentioned Non-patent documents 1 and 2, a major degree and a minor degree of a combination of two or more of source information, destination information, a link and a relation content are not taken into consideration, and therefore, there has been a problem that unpredictable information which attracts a user's interest could not be presented.

Control Structure

Figure 6:
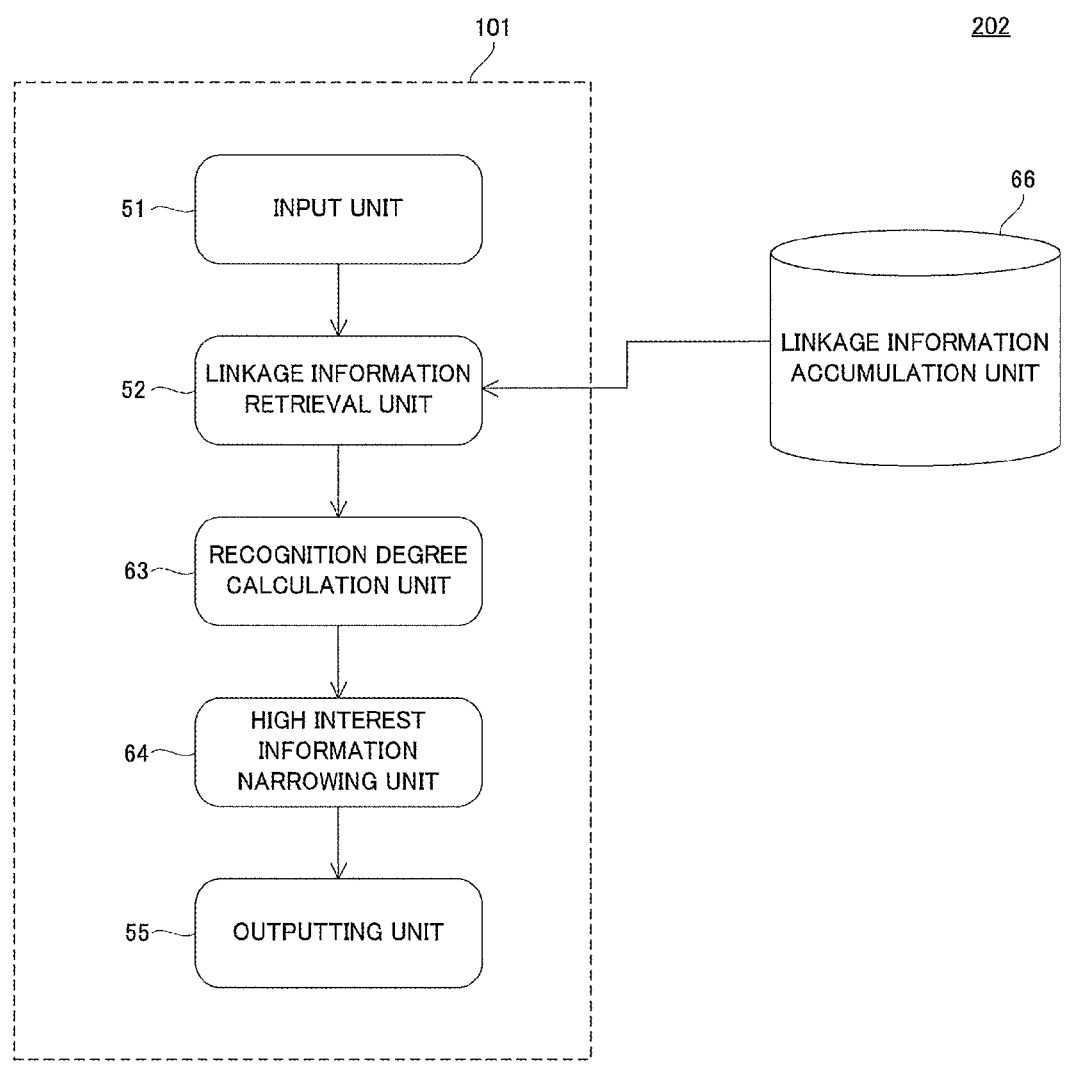
FIG. 6 is a block diagram indicating a control structure which a linkage information output apparatus according to a second embodiment of the present invention provides.

FIG. 6 is a block diagram indicating a control structure which a linkage information output apparatus according to the second embodiment of the present invention provides.

Each block of a linkage information output apparatus 202 indicated in FIG. 6 is provided by reading out a program (code) etc. stored in the hard disk 103 and writing to the main memory 102, and making the CPU101 execute the program. Besides, a part or all of modules shown in FIG. 6 may be provided by a firmware implemented in hardware. Alternatively, a part or all of control structures shown in FIG. 6 may be realized by dedicated hardware and/or a wiring circuit.

With reference to FIG. 6, the linkage information output apparatus 202, as compared with the linkage information output apparatus according to the first embodiment of the present invention, comprises a linkage information accumulation unit 66 in place of the linkage information accumulation unit 56. The CPU101, as compared with the linkage information output apparatus according to the first embodiment of the present invention, comprises as the control structure a recognition degree calculation unit 63 and a high interest information narrowing unit 64 in place of the recognition degree calculation unit 53 and the high interest information narrowing unit 54. The linkage information accumulation unit 66 corresponds to the main memory 102 or the hard disk 103 indicated in FIG. 1, for example.

The CPU101 is generally comprised of many units other than each part indicated in FIG. 6, but units which are not associated with the present invention are not illustrated for making a description simple.

Hereinafter, a different point from the first embodiment of the present invention will be mainly described. FIG. 7 is a figure indicating examples of accumulation information of a linkage information accumulation unit in the linkage information output apparatus according to the second embodiment of the present invention.

With reference to FIG. 7, the linkage information accumulation unit 66 has a table T3 in place of the table T1 as compared with the linkage information output apparatus according to the first embodiment of the present invention. In table T3, linkage information is accumulated, and one record indicates one of linkage information. Then, the table T3 differs from the table T1 in that the table T3 includes, as linkage information, not only source information, destination information and a frequency, but a relation content. The first record indicates that a relation content of "Nippon Budokan Hall" and "Momoe Yamaguchi" is "concert." The second record indicates that source information and destination information are the same as that of the first record, but a relation content is "Location".

The recognition degree calculation unit 63 differs from the recognition degree calculation unit 53 in that a recognition degree of a relation content is further calculated. The recognition degree calculation unit 63, in source information, destination information or these categories, measures a recognition degree of the relation content depending on whether a relation content appears frequently or not.

For example, a case where a category of source information is "hall" and a category of destination information is "entertainer" is considered. In this case, a recognition degree is high since a frequency of a relation content "concert" is as high as 47. Since a frequency of a relation content "design" is as low as 25, the recognition degree is low.

Alternatively, the linkage information output apparatus 202 has stored as a relation content in advance a relation content which is considered that a recognition degree is high, and in the case where a relation content of a recognition degree determination object includes this relation content, it may be determined that the recognition degree is high.

The high interest information narrowing unit 64 differs from the high interest information narrowing unit 54 in that a rule in which a recognition degree of a relation content is further taken into consideration is applied as described later.

Operation

Then, an operation of the linkage information output apparatus according to the second embodiment of the present invention will be described using the figures. In the second embodiment of the present invention, a linkage information output method according to the second embodiment of the present invention is performed by operating the linkage information output apparatus 202. Therefore, a description of the linkage information output method according to the second embodiment of the present invention is substituted by a operation description of the following linkage information output apparatus 202. In the following description, FIG. 6 is referred to suitably.

Figure 8:
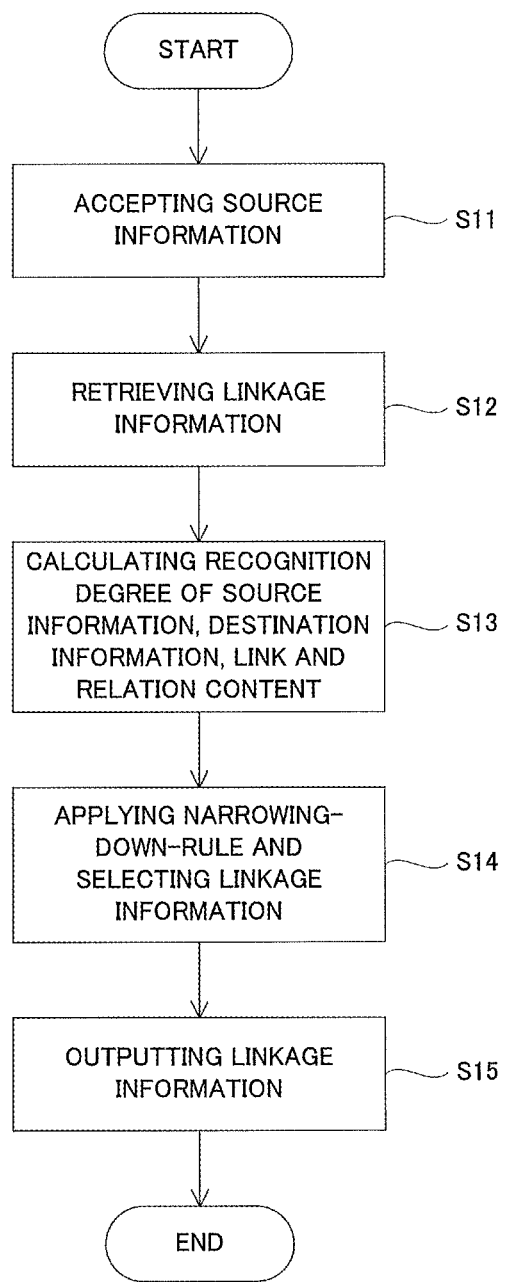
FIG. 8 is a flow chart showing operation procedures in the case where the linkage information output apparatus according to the second embodiment of the present invention performs linkage information output processing.

FIG. 8 is a flow chart showing operation procedures in the case where the linkage information output apparatus according to the second embodiment of the present invention performs linkage information output processing.

With reference to FIG. 8, first, the input unit 51 accepts one or more of source information. For example, "Nippon Budokan Hall" is inputted (Step S11).

Then, the linkage information retrieval unit 52 retrieves linkage information. Where, search results including a relation content differs from the first embodiment of the present invention. That is, in the case where accumulation contents of a second linkage information accumulation unit 206 are examples indicated in FIG. 7, the linkage information retrieval unit 52 returns as search results a link frequency of linkage information ("Nippon Budokan Hall", "Momoe Yamaguchi", "concert") of 47, a link frequency of linkage information ("Nippon Budokan Hall", "Momoe Yamaguchi", "Location") of 3, or the like (Step S12).

Then, the recognition degree calculation unit 63, with respect to each of linkage information, calculates a recognition degree of each of source information, destination information, a link and a relation content. The recognition degree of source information, destination information and a link is calculated in the same way as that of the first embodiment of the present invention. Then, the recognition degree calculation unit 63 calculates, as a recognition degree of the relation content, a relative frequency against the whole linkage information, a relative frequency against search results by the linkage information retrieval unit 52, a relative difference against an average frequency of occurrence, or an appearance probability in an estimated distribution of the whole linkage information. Alternatively, the recognition degree calculation unit 63 calculates a recognition degree of the relation content based on whether a keyword set in advance exists. Alternatively, the recognition degree calculation unit 63, using categories of source information and destination information, calculates, as a recognition degree of the relation content, an appearance probability of the relation content of categories of source information and destination information (Step S13).

In the linkage information output apparatus 202, for example, in accordance with each equation in the following, a recognition degree is calculated based on an appearance probability of a relation content of a category of source information and a category of destination information:

recognition degree(relation content $AB$)=a frequency of a relation content $AB$ of a category $CA$ of source information $A$ and a category $CB$ of destination information $B$/a link frequency of a category $CA$ of source information $A$ and a category $CB$ of destination information $B$.

Then, the recognition degree calculation unit 63 determines that the information is high in a recognition degree, and is major if the calculated recognition degree is not less than a prescribed threshold value set in advance.

For example, a recognition degree of a relation content in the linkage information ("Nippon Budokan Hall", "Momoe Yamaguchi", "Location") is calculated as follows:

recognition degree(Location)=a frequency of a relation content "Location" of a category "hall" and a category "entertainer"/a link frequency of a category "hall" and a category "entertainer".

Here, among linkage information where a category of source information becomes "hall" and a category of destination information becomes "entertainer", supposing a frequency where a relation content is "Location" is 30, and the link frequency is 500, the recognition degree is given by:

recognition degree(Location)=30/500=0.06.

In the case of linkage information ("Fukudaya hotel", "Momoe Yamaguchi", "Location"), a recognition degree of a relation content is calculated as follows:

recognition degree(Location)=a frequency of a relation content "Location" of a category "hotel" and a category "entertainer"/a link frequency of a category "hotel" and a category "entertainer".

Here, among linkage information where a category of source information becomes "hall" and a category of destination information becomes "entertainer", supposing a frequency where a relation content is "Location" is 80, and the link frequency is 400, the recognition degree is given by:

recognition degree(Location)=80/400=0.20.

That is, it turns out that it is more nearly major for an entertainer to do Location in a hotel as compared with an entertainer doing Location in a hall.

Then, the high interest information narrowing unit 64 accepts a recognition degree from the recognition degree calculation unit 63, and determines whether there exists unpredictability in the linkage information by referring to a rule incorporated inside the high interest information narrowing unit 64 (Step S14).

FIG. 9 is a figure indicating an example of a rule of an unpredictability determination in the high interest information narrowing unit 64. With reference to FIG. 9, this rule indicates whether there exists unpredictability for every combination of whether source information, destination information, a link and a relation content is each major.

In examples indicated in FIG. 9, in the case where all of source information, destination information, a link and a relation content are major, it is determined that there is no unpredictability. Because, it is considered that such information is ordinary linkage information which everyone knows, and a possibility of being already known information is high.

On the contrary, also in the case where all of source information, destination information, a link and a relation content are minor, it is determined that there is no unpredictability. Because, it is considered that such information is the information which a user does not know or not wish to know very much, and the meaning cannot be guessed even if presented. In the case where a recognition degree of one of source information and destination information is high and the other is low, and a recognition degree of a link and a relation content is low, it is considered that such information is the information where destination information or source information is known for a user, but the relation content is unpredictable.

In more details, the high interest information narrowing unit 64 determines that such information has unpredictability in the case where recognition degrees of source information, destination information and a link are high, and a recognition degree of a relation content is low. In addition, the high interest information narrowing unit 64 determines that there exists the unpredictability in the case where all the recognition degrees of source information, destination information, and a link are low, and a recognition degree of a relation content is high. The high interest information narrowing unit 64, in the case where a recognition degree of one of source information and destination information is high and the other is low, and a recognition degree of a link is low, determines that such information has the unpredictability. The high interest information narrowing unit 64, in the case where a recognition degree of source information and destination information is high, and a recognition degree of at least one of a link and relation content is low, determines that such information has the unpredictability. Then, in the cases other than those, the high interest information narrowing unit 64 determines that the information does not have the unpredictability.

Furthermore, the high interest information narrowing unit 64 may have a degree of unpredictability included in these rules. For example, the high interest information narrowing unit 64, in the case where a recognition degree of source information and destination information is high, and a recognition degree of at least one of a link and relation content is low, determines that such information is the information having the unpredictability which is high in a high level. The high interest information narrowing unit 64, in the case where a recognition degree of one of source information and destination information is high and the other is low, a recognition degree of a link is low, and a recognition degree of a relation content is high, determines that such information is the information having the unpredictability which is high in a middle level. By means of a configuration like this, only linkage information having a high degree of unpredictability can be given to the outputting unit 55.

Finally, the outputting unit 55 accepts information from the high interest information narrowing unit 64, and outputs this (Step S15).

As mentioned above, in the linkage information output apparatus according to the second embodiment of the present invention, the linkage information retrieval unit 52, receiving source information from the input unit 51, acquires from the linkage information accumulation unit 66: a plurality of destination information linked with source information; a relation content of source information and each destination information; a frequency of occurrence of source information; a frequency of occurrence of each destination information; a frequency of occurrence of a link between source information and each destination information; and a frequency of occurrence of each relation content. The recognition degree calculation unit 63, based on acquired each frequency of occurrence, calculates: a recognition degree of source information; a recognition degree of acquired each destination information; a recognition degree of each link; and a recognition degree of acquired each relation content. Then, the high interest information narrowing unit 64, based on a recognition degree of source information, a recognition degree of destination information, a recognition degree of a link, and a recognition degree of a relation content, selects one or more of destination information from among destination information to be outputted to the outputting unit 55.

In this manner, by using a recognition degree of source information, destination information, a link, and a relation content, it is possible to carry out narrowing-down to high interest information which is more unpredictable as compared with the linkage information output apparatus according to the first embodiment of the present invention, and thereby, it becomes possible to present unpredictable information which furthermore attracts a user's interest.

In the linkage information output apparatus according to the second embodiment of the present invention, the high interest information narrowing unit 64, as indicated in FIG. 9, from among destination information, selects destination information where a recognition degree of source information, a recognition degree of destination information, and a recognition degree of a link become higher than a prescribed threshold value, and a recognition degree of a relation content becomes lower than a prescribed threshold value. In addition, the high interest information narrowing unit 64, from among destination information, selects destination information where a recognition degree of source information, a recognition degree of destination information, and a recognition degree of a link become lower than a prescribed threshold value, and a recognition degree of a relation content becomes higher than a prescribed threshold value. In addition, the high interest information narrowing unit 64, from among destination information, selects destination information where a recognition degree of source information and a recognition degree of destination information become higher than a prescribed threshold value, and at least one of a recognition degree of a link and a recognition degree of a relation content becomes lower than a prescribed threshold value. In addition, the high interest information narrowing unit 64, from among destination information, selects destination information where a recognition degree of one of a recognition degree of the source information and destination information become higher than a prescribed threshold value, and a recognition degree of the other becomes lower than a prescribed threshold value, and a recognition degree of a link becomes lower than a prescribed threshold value.

By means of a configuration like this, unpredictable high interest information can be appropriately narrowed down from a plurality of linkage information.

In addition, the linkage information output apparatus according to the second embodiment of the present invention, the high interest information narrowing unit 64, as indicated in FIG. 9, from among selected destination information, selects destination information where a recognition degree of source information and a recognition degree of destination information become higher than a prescribed threshold value, and at least one of a recognition degree of a link and a recognition degree of a relation content becomes lower than a prescribed threshold value as destination information where unpredictability is high in a high level among selected destination information. In addition, the high interest information narrowing unit 64, from among destination information, selects destination information where a recognition degree of one of a recognition degree of source information and destination information becomes higher than a prescribed threshold value, and a recognition degree of the other becomes lower than a prescribed threshold value, and a recognition degree of a link becomes lower than a prescribed threshold value, and a recognition degree of a relation content becomes higher than a prescribed threshold value as destination information where unpredictability is high in a middle level among selected destination information.

By means of a configuration like this, it is possible to present a user unpredictable high interest information step by step, and a user's degree of satisfaction can be enhanced further.

In the linkage information output apparatus according to the second embodiment of the present invention, the linkage information retrieval unit 52, further, acquires category information of source information, and category information of linked each destination information from the linkage information accumulation unit 66. Then, the recognition degree calculation unit 63, with respect to a link between a categories of each of source information and destination information corresponding to a relation content of which a recognition degree is to be calculated, calculates an appearance probability of a relation content based on a total of frequencies of occurrence of links between categories and on a frequency of occurrence of a relation content, and makes the calculated appearance probability be a recognition degree of the relation content.

By means of a configuration like this, a recognition degree of a link is appropriately calculated from a viewpoint of a category, and thereby, high interest information can be narrowed down in a higher accuracy.

Besides, in the linkage information output apparatus according to the second embodiment of the present invention, the high interest information narrowing unit 64 is made to be configured so as to select one or more of destination information from each destination information based on a recognition degree of source information, a recognition degree of destination information, a recognition degree of a link, and a recognition degree of relation content, but is not limited to this. The high interest information narrowing unit 64 may be configured so as to select one or more of destination information from among destination information based on a combination of two or more among a recognition degree of source information, a recognition degree of destination information, a recognition degree of a link, and a recognition degree of relation content.

In this case, it is possible to apply a narrowing-down rule in the first embodiment of the present invention to the linkage information output apparatus according to the second embodiment of the present invention. Other than this, for example, the high interest information narrowing unit 64 selects source information and a relation content, and determines that the linkage information has the unpredictability in the case where the source information is major and the relation content is minor. In addition, the high interest information narrowing unit 64 selects destination information and a relation content, and determines that the linkage information has the unpredictability in the case where the destination information is major and the relation content is minor. In addition, the high interest information narrowing unit 64 selects a link and a relation content, and determines that the linkage information has the unpredictability in the case where the link is major and the relation content is minor.

In the linkage information output apparatus according to the second embodiment of the present invention, the high interest information narrowing unit 64 is made to be configured so as to determine the unpredictability in accordance with a rule indicated in FIG. 9, but is not limited to this. The high interest information narrowing unit 64, for example, may be configured so as to determine that there is the unpredictability only in the case where source information, destination information, and a link are major and a relation content is minor, and only in the case where source information, destination information, and a link are minor and a relation content is major.

Next, an other embodiment of the present invention will be described using the figures. It is noted that the same reference character will be given to the same or corresponding part in the figures, and thus the description will not be repeated.

Third Embodiment

The present embodiment relates to a position information display apparatus to which the linkage information output apparatus according to the second embodiment is applied. Contents other than described in the following are the same as those of the linkage information output apparatus according to the first embodiment or the second embodiment.

Figure 10:
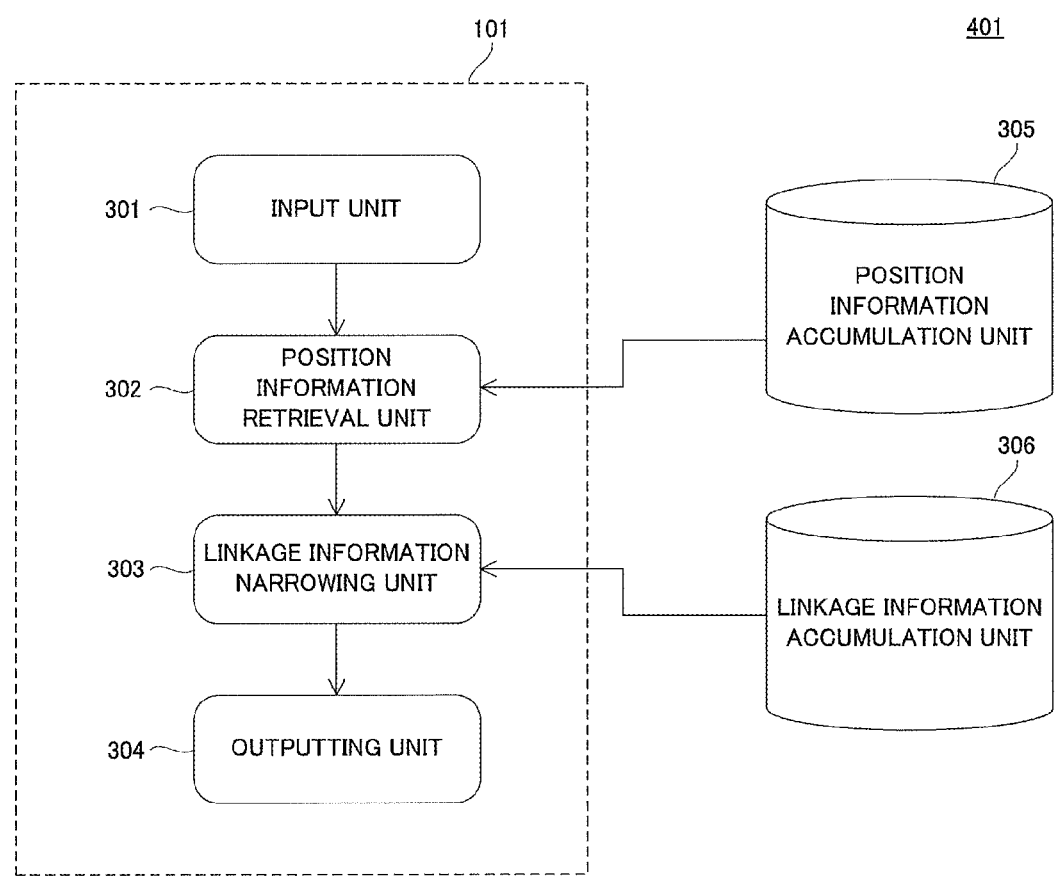
FIG. 10 is a block diagram indicating a control structure which a position information display apparatus according to a third embodiment of the present invention provides.

FIG. 10 is a block diagram indicating a control structure which a position information display apparatus according to the third embodiment of the present invention provides.

Each block of a position information display apparatus 401 indicated in FIG. 10 is provided by reading out a program (code) etc. stored in the hard disk 103 and writing to the main memory 102, and making a CPU101 execute the program. Besides, a part or all of modules shown in FIG. 10 may be provided by a firmware implemented in hardware. Alternatively, a part or all of control structures shown in FIG. 10 may be realized by dedicated hardware and/or a wiring circuit.

With reference to FIG. 10, the position information display apparatus 401 comprises the CPU101, a position information accumulation unit 305, and a linkage information accumulation unit 306. The CPU101 includes an input unit 301, a position information retrieval unit 302, a linkage information narrowing unit 303, and an outputting unit 304 as the control structure. The position information accumulation unit 305 and the linkage information accumulation unit 306, for example, corresponds to the main memory 102 or the hard disk 103 indicated in FIG. 1.

The CPU101 is generally comprised of many units other than each part indicated in FIG. 10, but units which are not associated with the present invention are not illustrated for making a description simple.

The position information accumulation unit 305 accumulates spot information of a station, a building, a temple, etc. together with a name thereof, information specifying places of an address, a latitude-longitude or the like and a category indicating a classification.

The linkage information accumulation unit 306 accumulates linkage information linked with position information. That is, the linkage information accumulation unit 306 accumulates information where source information is made to be position information, destination information is made to be a name of things (hereinafter, also referred to as a relation object) linked with the position, and a relation content is made to be a keyword and sentence indicating linkage of position information and a relation object.

The position information retrieval unit 302 refers to the position information accumulation unit 305 and retrieves position information with a name of position information, an address of position information, a latitude-longitude of position information, and a category of position information as a condition.

The linkage information narrowing unit 303 corresponds to the linkage information retrieval unit 52, the recognition degree calculation unit 63, and the high interest information narrowing unit 64 in the linkage information output apparatus according to the second embodiment of the present invention. Where, the linkage information narrowing unit 303 also performs filtering for an output of the high interest information narrowing unit 64 by means of a category of linkage information and a keyword of a relation content.

Figure 11:
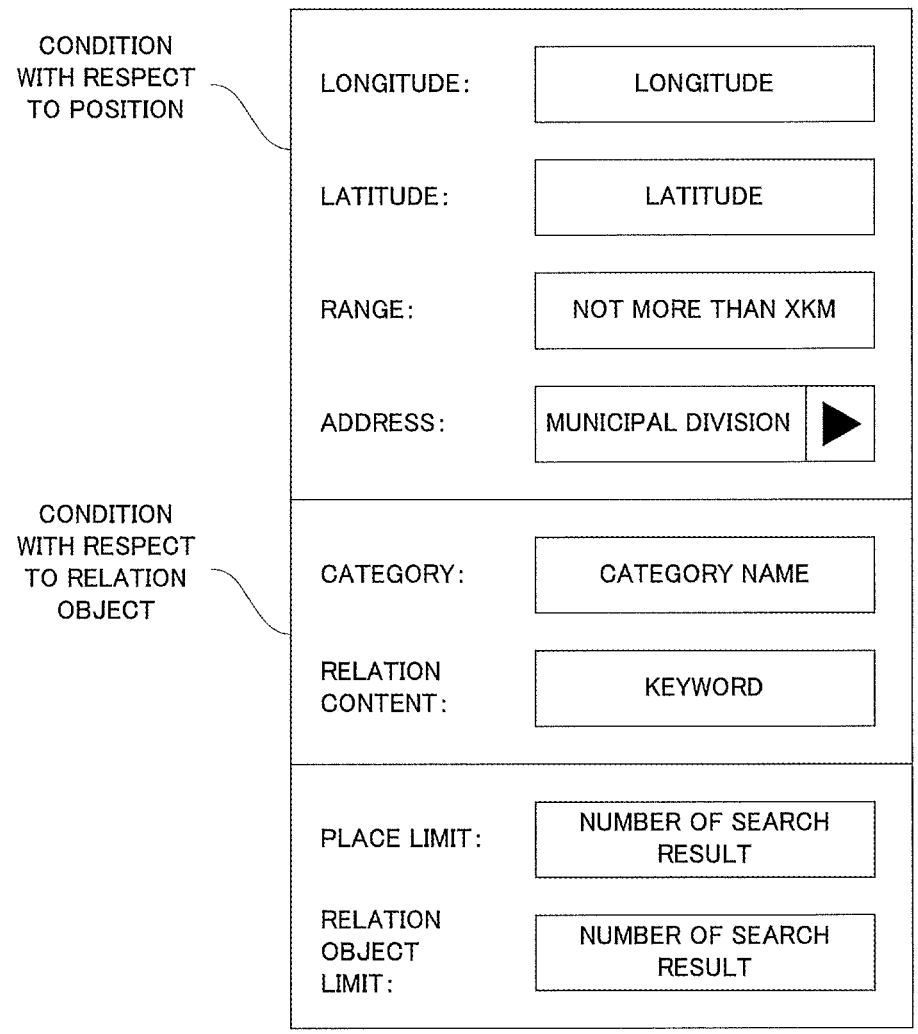
FIG. 11 is a figure indicating an example of an input content which an input unit in the position information display apparatus according to the third embodiment of the present invention provides.

FIG. 11 is a figure indicating an example of an input content which an input unit in the position information display apparatus according to the third embodiment of the present invention provides.

With reference to FIG. 11, first, the input unit 301 accepts an input from a user. That is, the input unit 301 accepts a search condition as information from a user.

In more details, the input unit 301 accepts one or more search conditions among spatial narrowing conditions such as a name of position information, an address of position information and a latitude-longitude, and conditions with respect to a position such as a position information category, and conditions with respect to a relation object such as a name of the relation object, a category of the relation object, and a relation content keyword. For example, in examples of FIG. 12, the input unit 301 accepts a latitude-longitude, a range of position information, an address, a category of a relation object, and a keyword of a relation content. In examples of FIG. 11, there exists also a field for specifying upper limit of a position information list and upper limit of a relation object information list, which is displayed at the time of an output of linkage information.

Then, the position information retrieval unit 302 refers to the position information accumulation unit 305, and narrows down position information.

FIG. 12 is a figure indicating an example of accumulation information of the position information accumulation unit in the position information display apparatus according to the third embodiment of the present invention.

With reference to FIG. 12, the position information accumulation unit 305 is a database to accumulate a name of position information, an address of position information, a latitude-longitude of position information and a category of position information.

The position information retrieval unit 302 retrieves position information based on conditions with respect to position information. For example, suppose that "Nippon Budokan Hall" and "sylvan music hall" are acquired as a result of search.

Then, the linkage information narrowing unit 303, with a name of position information and conditions with respect to a relation object as an input, refers to the linkage information accumulation unit 306 and performs narrowing down into unpredictable linkage information. For example, with "Nippon Budokan Hall" as an input, linkage information ("Nippon Budokan Hall", "Momoe Yamaguchi", "Location"), linkage information ("Nippon Budokan Hall", "Self-Defense Forces", "concert"), and linkage information ("sylvan music hall", "Seiji Ozawa", "design") are returned.

The outputting unit 304 displays results conforming to search conditions from a user, i.e. position information and linkage information acquired by the position information retrieval unit 302 and the linkage information narrowing unit 303. The outputting unit 304 outputs linkage information to the hard disk 103 or the display 110 indicated in FIG. 1, for example.

Figure 13:
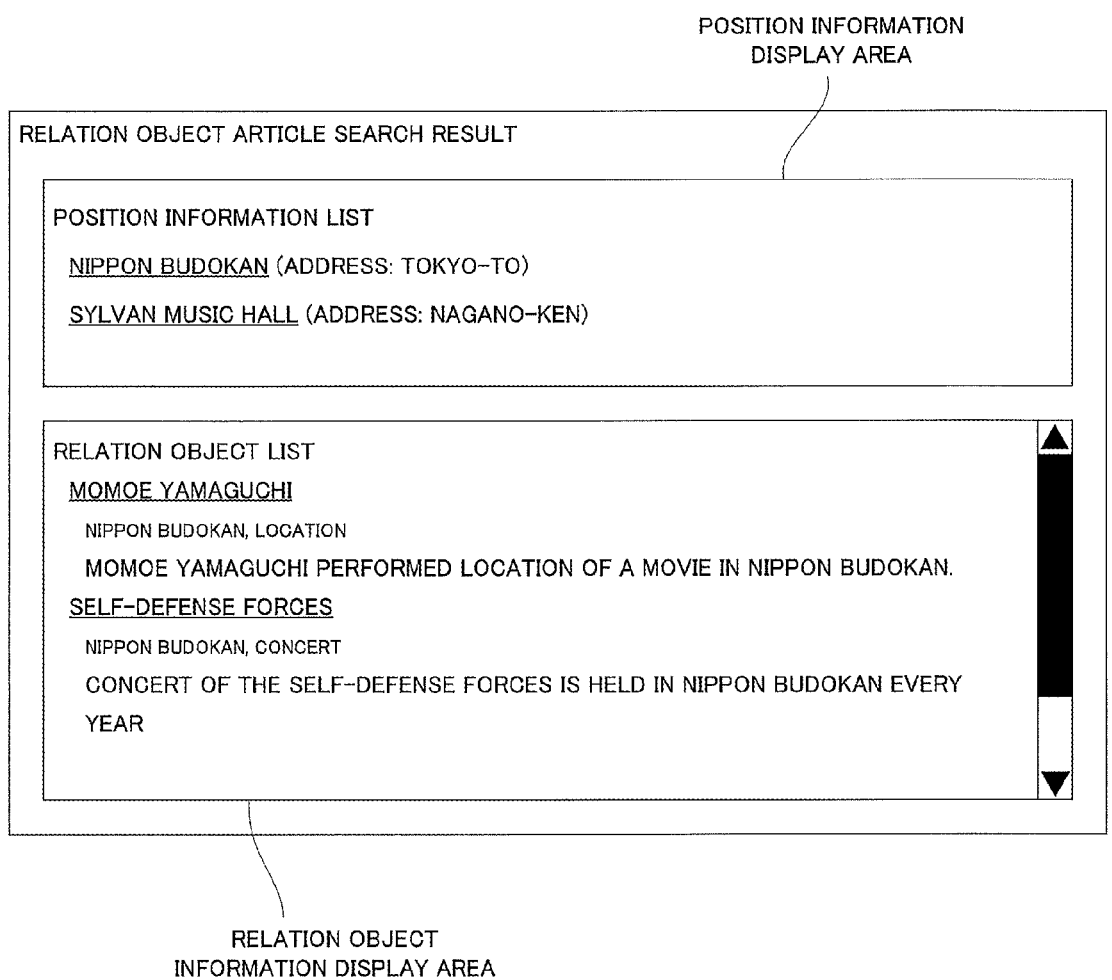
FIG. 13 is a figure indicating an example of output contents of the position information display apparatus according to the third embodiment of the present invention.

FIG. 13 is a figure indicating an example of output contents of the position information display apparatus according to the third embodiment of the present invention.

With reference to FIG. 13, the outputting unit 304 outputs a position information list on an upper part (position information display area) of a screen of the display 110, for example, and outputs a relation object list on a lower part (relation object information display area). When a user selects position information on the screen upper part in the screen, a relation object list on the screen lower part is narrowed down, by the outputting unit 304, into only ones linked with the selected position information. In addition, the outputting unit 304, if a user selects a relation object, displays a detailed page of the selected relation object.

Since other configurations and operations are the same as those of the linkage information output apparatus according to the second embodiment, detailed descriptions are not repeated here.

A part or all of the above-mentioned embodiments are described also as the following additional statements, and however, the scope of the present invention is not limited to the following additional statements.

Additional Statement 1

A linkage information output apparatus for outputting information linked with source information comprising:

a linkage information retrieval unit which receives said source information, and acquires a plurality of destination information linked with said source information, a frequency of occurrence of said source information, a frequency of occurrence of linked each said destination information, and a frequency of occurrence of a link of said source information and said each destination information, from a linkage information accumulation unit provided inside or outside said linkage information output apparatus;

a recognition degree calculation unit which, based on acquired each said frequency of occurrence, calculates a recognition degree of said source information, a recognition degree of acquired said each destination information, and a recognition degree of each said link; and a high interest information narrowing unit which selects one or more of said destination information from among said each destination information based on a combination of two or more among a recognition degree of said source information, a recognition degree of said destination information and a recognition degree of said link, and outputs at least selected said destination information.

Additional Statement 2

The Linkage information output apparatus according to Additional statement 1, wherein said high interest information narrowing unit selects any two among said source information, said destination information, and said link, and selects, from among said each destination information, said destination information where a recognition degree of one of the selected ones becomes higher than a prescribed threshold value and a recognition degree of the other becomes lower than a prescribed threshold value.

Additional Statement 3

The linkage information output apparatus according to Additional statement 1 or Additional statement 2, wherein said high interest information narrowing unit selects, from among said each destination information, said destination information where at least one of a recognition degree of said source information or a recognition degree of said destination information becomes higher than a prescribed threshold value, and a recognition degree of said link becomes lower than a prescribed threshold value.

Additional Statement 4

The linkage information output apparatus according to Additional statement 2 or Additional statement 3, wherein said high interest information narrowing unit, further, from among selected said destination information, selects destination information where a recognition degree of said source information and a recognition degree of said destination information become higher than a prescribed threshold value, and where a recognition degree of said link becomes lower than a prescribed threshold value, as destination information where unpredictability is high in a high level.

Additional Statement 5

The linkage information output apparatus according to any of Additional statements 1 to 4, wherein said recognition degree calculation unit, with respect to object information for which said recognition degree is to be calculated among said source information and acquired said each destination information and said each link, acquires a total of frequencies of occurrence corresponding to said object information among a total of frequencies of occurrence of all of source information accumulated in said linkage information accumulation unit and a total of frequencies of occurrence of all of destination information accumulated in said linkage information accumulation unit and a total of frequencies of occurrence of all the links accumulated in said linkage information accumulation unit, and estimates an appearance probability distribution from acquired said total of frequencies of occurrence, and calculates an appearance probability of said object information as a recognition degree of said object information using said estimated appearance probability distribution.

Additional Statement 6

The linkage information output apparatus according to any of Additional statements 1 to 4, wherein said recognition degree calculation unit, with respect to an object information where said recognition degree is to be calculated among said source information, acquired said each destination information, and said link, acquires a total of frequencies of occurrence corresponding to said object information among a total of frequencies of occurrence of all of source information accumulated in said linkage information accumulation unit and a total of frequencies of occurrence of all of destination information accumulated in said linkage information accumulation unit and a total of frequencies of occurrence of all the links accumulated in said linkage information accumulation unit, and calculates an average frequency of occurrence from acquired said total of frequencies of occurrence, and calculates, as a recognition degree of said object information, a difference between said calculated average frequency of occurrence and the frequency of occurrence of said object information.

Additional Statement 7

The linkage information output apparatus according to any of Additional statements 1 to 6, wherein said linkage information retrieval unit, further, acquires category information of said source information and category information of linked said each destination information from said linkage information accumulation unit, and said recognition degree calculation unit, from a total of frequencies of occurrence of links between categories of said source information and said destination information corresponding to an object link which is said link of which said recognition degree is to be calculated, estimates an appearance probability distribution, and using said estimated appearance probability distribution, calculates an appearance probability of the link between said categories as a recognition degree of said object link.

Additional Statement 8

The linkage information output apparatus according to Additional statement 7, wherein said recognition degree calculation unit, in the case where at least one of said source information and said destination information which correspond to said object link belongs to a plurality of categories, an average value, the maximum or the minimum of said recognition degrees calculated with respect to each said category is made to be a recognition degree of said object link.

Additional Statement 9

The linkage information output apparatus according to any of Additional statements 1 to 8, wherein
said linkage information retrieval unit, further, acquires category information of said source information, and category information of linked said each destination information from said linkage information accumulation unit, and
said recognition degree calculation unit, with respect to object information of which said recognition degree is to be calculated among said source information and acquired said each destination information, acquires a total of frequencies of occurrence corresponding to said object information among a total of frequencies of occurrence of categories of all of source information accumulated in said linkage information accumulation unit, and a total of frequencies of occurrence of categories of all of destination information accumulated in said linkage information accumulation unit, and estimates an appearance probability distribution from acquired said total of frequencies of occurrence, and calculates an appearance probability of the category of said object information as a recognition degree of said object information using said estimated appearance probability distribution.

Additional Statement 10

The linkage information output apparatus according to any of Additional statements 1 to 8, wherein
said linkage information retrieval unit, further, acquires category information of said source information, and category information of linked said each destination information from said linkage information accumulation unit, and
said recognition degree calculation unit, with respect to object information of which said recognition degree is to be calculated among said source information and acquired said each destination information, acquires a total of frequencies of occurrence corresponding to said object information among a total of frequencies of occurrence of categories of all of source information accumulated in said linkage information accumulation unit, and a total of frequencies of occurrence of categories of all of destination information accumulated in said linkage information accumulation unit, and calculates an average frequency of occurrence from acquired said total of frequencies of occurrence, and calculates a difference between the calculated average frequency of occurrence and the frequency of occurrence of the category of said object information as a recognition degree of said object information.

Additional Statement 11

The linkage information output apparatus according to Additional statement 9 or Additional statement 10, wherein
said recognition degree calculation unit, in the case where said object information belongs to a plurality of categories, an average value, the maximum or the minimum of said recognition degree calculated with respect to each said category is made to be a recognition degree of said object information.

Additional Statement 12

The linkage information output apparatus according to any of Additional statements 1 to 11, wherein said linkage information retrieval unit, on receiving said source information, from said linkage information accumulation unit, acquires: a plurality of destination information linked with said source information; a relation content of said source information and each said destination information; a frequency of occurrence of said source information; a frequency of occurrence of said each destination information; a frequency of occurrence of a link of said source information and said each destination information; and a frequency of occurrence of each said relation content, and
said recognition degree calculation unit, based on acquired each said frequency of occurrence, calculates: a recognition degree of said source information; a recognition degree of acquired said each destination information; a recognition degree of each said link; and a recognition degree of acquired said each relation content, and
said high interest information narrowing unit, based on a combination of two or more among a recognition degree of said source information, a recognition degree of said destination information, a recognition degree of said link and a recognition degree of said relation content, selects one or more of said destination information from said each destination information, and outputs at least selected said destination information.

Additional Statement 13

The linkage information output apparatus according to Additional statement 12, wherein
said high interest information narrowing unit selects, from among said each destination information, said destination information where a recognition degree of said source information, a recognition degree of said destination information, and a recognition degree of said link become higher than a prescribed threshold value, and a recognition degree of said relation content becomes lower than a prescribed threshold value, and
selects, from among said each destination information, said destination information where a recognition degree of said source information, a recognition degree of said destination information, and a recognition degree of said link become lower than a prescribed threshold value, and a recognition degree of said relation content becomes higher than a prescribed threshold value.

Additional Statement 14

The linkage information output apparatus according to Additional statement 13, wherein
said high interest information narrowing unit, further, selects, from among said each destination information, said destination information where a recognition degree of said source information and a recognition degree of said destination information become higher than a prescribed threshold value, and at least one of a recognition degree of said link and a recognition degree of said relation content becomes lower than a prescribed threshold value, and
selects, from among said each destination information, said destination information where a recognition degree of one of a recognition degree of said source information and said destination information become higher than a prescribed threshold value, and a recognition degree of the other becomes lower than a prescribed threshold value, and a recognition degree of said link becomes lower than a prescribed threshold value,
said high interest information narrowing unit, selects, from among selected said destination information, said destination information where a recognition degree of said source information and a recognition degree of said destination information become higher than a prescribed threshold value, and at least one of a recognition degree of said link and a recognition degree of said relation content becomes lower than a prescribed threshold value, as destination information where unpredictability is high in a high level among said selected destination information, and selects said destination information where a recognition degree of one of a recognition degree of said source information and said destination information becomes higher than a prescribed threshold value, and a recognition degree of the other becomes lower than a prescribed threshold value, a recognition degree of said link becomes lower than a prescribed threshold value, and a recognition degree of said relation content becomes higher than a prescribed threshold value, as destination information where unpredictability is high in a middle level among selected said destination information.

Additional Statement 15

The linkage information output apparatus according to any of Additional statements 12 to 14, wherein
said linkage information retrieval unit, further, acquires category information of said source information, and category information of linked said each destination information from said linkage information accumulation unit, and
said recognition degree calculation unit, with respect to links between categories of each of said source information and said destination information which correspond to said relation content of which said recognition degree is to be calculated, calculates an appearance probability of said relation content based on a total of frequencies of occurrence of links between said categories and frequencies of occurrence of said relation content, and said calculated appearance probability is made to be a recognition degree of said relation content.

Additional Statement 16

A linkage information output method in a linkage information output apparatus for outputting information linked with source information, comprising the steps of:
acquiring, on receiving said source information, a plurality of destination information linked with said source information, a frequency of occurrence of said source information, a frequency of occurrence of linked each said destination information, and a frequency of occurrence of a link of said source information and said each destination information, from a linkage information accumulation unit provided inside or outside said linkage information output apparatus;
calculating, based on acquired each said frequency of occurrence, a recognition degree of said source information, a recognition degree of acquired said each destination information, a recognition degree of each said link; and
selecting one or more of said destination information from among said each destination information based on a combination of two or more among a recognition degree of said source information, a recognition degree of said destination information and a recognition degree of said link, and outputting at least selected said destination information.

Additional Statement 17

The linkage information output method according to Additional statement 16, wherein
in the step for selecting said destination information, selected are any two among said source information, said destination information, and said link, and selected from among said each destination information is said destination information where a recognition degree of one of the selected ones becomes higher than a prescribed threshold value and a recognition degree of the other becomes lower than a prescribed threshold value.

Additional Statement 18

The linkage information output method according to Additional statement 16 or Additional statement 17, wherein
in the step for selecting said destination information, selected is, from among said each destination information, said destination information where at least one of a recognition degree of said source information or a recognition degree of said destination information becomes higher than a prescribed threshold value, and a recognition degree of said link becomes lower than a prescribed threshold value.

Additional Statement 19

The linkage information output method according to Additional statement 17 or Additional statement 18, wherein
in the step for selecting said destination information, further, from among selected said destination information, selected is destination information where a recognition degree of said source information and a recognition degree of said destination information become higher than a prescribed threshold value, and where a recognition degree of said link becomes lower than a prescribed threshold value, as destination information where unpredictability is high in a high level.

Additional Statement 20

The linkage information output method according to any of Additional statements 16 to 19, wherein
in the step for calculating said recognition degree, with respect to object information for which said recognition degree is to be calculated among said source information and acquired said each destination information and said each link, acquired are a total of frequencies of occurrence corresponding to said object information among a total of frequencies of occurrence of all of source information accumulated in said linkage information accumulation unit and a total of frequencies of occurrence of all of destination information accumulated in said linkage information accumulation unit and a total of frequencies of occurrence of all the links accumulated in said linkage information accumulation unit, and estimated is an appearance probability distribution from acquired said total of frequencies of occurrence, and calculated is an appearance probability of said object information as a recognition degree of said object information using said estimated appearance probability distribution.

Additional Statement 21

The linkage information output method according to any of Additional statements 16 to 19, wherein
in the step for calculating said recognition degree, with respect to an object information where said recognition degree is to be calculated among said source information, acquired said each destination information, and said link, acquired are a total of frequencies of occurrence corresponding to said object information among a total of frequencies of occurrence of all of source information accumulated in said linkage information accumulation unit and a total of frequencies of occurrence of all of destination information accumulated in said linkage information accumulation unit and a total of frequencies of occurrence of all the links accumulated in said linkage information accumulation unit, and calculated is an average frequency of occurrence from acquired said total of frequencies of occurrence, and calculated is, as a recognition degree of said object information, a difference between said calculated average frequency of occurrence and the frequency of occurrence of said object information.

Additional Statement 22

The linkage information output method according to any of Additional statements 16 to 21, wherein in the step for acquiring said each destination information and said each frequency of occurrence, further, acquired are category information of said source information and category information of linked said each destination information from said linkage information accumulation unit, and in the step for calculating said recognition degree, from a total of frequencies of occurrence of links between categories of said source information and said destination information corresponding to an object link which is said link of which a recognition degree is to be calculated, estimated is an appearance probability distribution, and using said estimated appearance probability distribution, calculated is, as a recognition degree of said object link, an appearance probability of a link between said categories.

Additional Statement 23

The linkage information output method according to Additional statement 22, wherein in the step for calculating said recognition degree, in the case where at least one of said source information and said destination information which correspond to said object link belongs to a plurality of categories, an average value, the maximum or the minimum of said recognition degrees calculated with respect to each said category is made to be a recognition degree of said object link.

Additional Statement 24

The linkage information output method according to any of Additional statements 16 to 23, wherein in the step for acquiring said each destination information and said each frequency of occurrence, further, acquired are category information of said source information and category information of linked said each destination information from said linkage information accumulation unit, and in the step for calculating said recognition degree, with respect to object information of which said recognition degree is to be calculated among said source information and acquired said each destination information, acquired are a total of frequencies of occurrence corresponding to said object information among a total of frequencies of occurrence of categories of all of source information accumulated in said linkage information accumulation unit, a total of frequencies of occurrence of categories of all of destination information accumulated in said linkage information accumulation unit, and a total of frequencies of occurrence of categories of all the links accumulated in said linkage information accumulation unit, and estimated is an appearance probability distribution from acquired said total of frequencies of occurrence, and calculated is an appearance probability of a category of said object information as a recognition degree of said object information using said estimated appearance probability distribution.

Additional Statement 25

The linkage information output method according to any of Additional statements 16 to 23, wherein in the step for acquiring said each destination information and said each frequency of occurrence, further, acquired are category information of said source information and category information of linked said each destination information from said linkage information accumulation unit, and in the step for calculating said recognition degree, with respect to object information of which said recognition degree is to be calculated among said source information and acquired said each destination information, acquired are a total of frequencies of occurrence corresponding to said object information among a total of frequencies of occurrence of categories of all of source information accumulated in said linkage information accumulation unit, a total of frequencies of occurrence of categories of all of destination information accumulated in said linkage information accumulation unit, and a total of frequencies of occurrence of categories of all the links accumulated in said linkage information accumulation unit, and calculated is an average frequency of occurrence from acquired said total of frequencies of occurrence, and calculated is a difference between the calculated average frequency of occurrence and the frequency of occurrence of the category of said object information as a recognition degree of said object information.

Additional Statement 26

The linkage information output method according to Additional statements 24 or 25, wherein in the step for calculating said recognition degree, in the case where said object information belongs to a plurality of categories, an average value, the maximum or the minimum of said recognition degree calculated with respect to each said category is made to be a recognition degree of said object information.

Additional Statement 27

The linkage information output method according to any of Additional statements 16 to 26, wherein in the step for acquiring said each destination information and said each frequency of occurrence, on receiving said source information, from said linkage information accumulation unit, acquired are a plurality of destination information linked with said source information, a relation content of said source information and each said destination information, a frequency of occurrence of said source information, and a frequency of occurrence of said each destination information, a frequency of occurrence of a link of said source information and said each destination information, and a frequency of occurrence of each said relation content, and in the step for calculating said recognition degree, based on acquired each said frequency of occurrence, calculated are a recognition degree of said source information, a recognition degree of acquired said each destination information, a recognition degree of each said link, and a recognition degree of acquired said each relation content, and in the step for selecting said destination information, based on a combination of two or more among a recognition degree of said source information, a recognition degree of said destination information, a recognition degree of said link and a recognition degree of said relation content, selected are one or more of said destination information from said each destination information, and outputted is at least selected said destination information.

Additional Statement 28

The linkage information output method according to Additional statement 27, wherein
in the step for selecting said destination information, selected is, from among said each destination information, said destination information where a recognition degree of said source information, a recognition degree of said destination information, and a recognition degree of said link become higher than a prescribed threshold value, and a recognition degree of said relation content becomes lower than a prescribed threshold value, and selected is, from among said each destination information, said destination information where a recognition degree of said source information, a recognition degree of said destination information, and a recognition degree of said link become lower than a prescribed threshold value, and a recognition degree of said relation content becomes higher than a prescribed threshold value.

Additional Statement 29

The linkage information output method according to Additional statement 28, wherein
in the step for selecting said destination information, further, selected is, from among said each destination information, said destination information where a recognition degree of said source information and a recognition degree of said destination information become higher than a prescribed threshold value, and at least one of a recognition degree of said link and a recognition degree of said relation content becomes lower than a prescribed threshold value, as destination information where unpredictability is high in a high level among said selected destination information, and
selected is, from among said each destination information, said destination information where a recognition degree of one of a recognition degree of said source information and said destination information becomes higher than a prescribed threshold value, and a recognition degree of the other becomes lower than a prescribed threshold value, and a recognition degree of said link becomes lower than a prescribed threshold value, and
from among selected said destination information, selected is destination information where a recognition degree of said source information and a recognition degree of said destination information become higher than a prescribed threshold value, and at least one of a recognition degree of said link and a recognition degree of said relation content becomes lower than a prescribed threshold value, as destination information where unpredictability is high in a high level among said selected destination information, and selected is said destination information where a recognition degree of one of a recognition degree of said source information and said destination information becomes higher than a prescribed threshold value, and a recognition degree of the other becomes lower than a prescribed threshold value, a recognition degree of said link becomes lower than a prescribed threshold value, and a recognition degree of said relation content becomes higher than a prescribed threshold value, as destination information where unpredictability is high in a middle level among selected said destination information.

Additional Statement 30

The linkage information output method according to any of Additional statements 27 to 29, wherein
in the step for acquiring said each destination information and said each frequency of occurrence, further, acquired are category information of said source information and category information of linked said each destination information from said linkage information accumulation unit, and
in the step for calculating said recognition degree, with respect to links between categories of each of said source information and said destination information which correspond to said relation content of which said recognition degree is to be calculated, calculated is an appearance probability of said relation content based on a total of frequencies of occurrence of links between said categories and frequencies of occurrence of said relation content, and said calculated appearance probability is made to be a recognition degree of said relation content.

Additional Statement 31

A computer-readable recording medium having a linkage information output program used in a linkage information output apparatus for outputting information linked with source information recorded, the linkage information output program making a computer execute the steps of:
acquiring, on receiving said source information, a plurality of destination information linked with said source information, a frequency of occurrence of said source information, a frequency of occurrence of linked each said destination information, and a frequency of occurrence of a link of said source information and said each destination information, from a linkage information accumulation unit provided inside or outside said linkage information output apparatus;
calculating, based on acquired each said frequency of occurrence, a recognition degree of said source information, a recognition degree of acquired said each destination information, a recognition degree of each said link; and
selecting one or more of said destination information from among said each destination information based on a combination of two or more among a recognition degree of said source information, a recognition degree of said destination information and a recognition degree of said link, and outputting at least selected said destination information.

Additional Statement 32

The computer-readable recording medium according to Additional statement 31, wherein
in the step for selecting said destination information, selected are any two among said source information, said destination information, and said link, and selected from among said each destination information is said destination information where a recognition degree of one of the selected ones becomes higher than a prescribed threshold value and a recognition degree of the other becomes lower than a prescribed threshold value.

Additional Statement 33

The computer-readable recording medium according to Additional statements 31 or 32, wherein in the step for selecting said destination information, selected is, from among said each destination information, said destination information where at least one of a recognition degree of said source information or a recognition degree of said destination information becomes higher than a prescribed threshold value, and a recognition degree of said link becomes lower than a prescribed threshold value.

Additional Statement 34

The computer-readable recording medium according to Additional statements 32 or 33, wherein in the step for selecting said destination information, further, from among selected said destination information, selected is destination information where a recognition degree of said source information and a recognition degree of said destination information become higher than a prescribed threshold value, and where a recognition degree of said link becomes lower than a prescribed threshold value, as destination information where unpredictability is high in a high level.

Additional Statement 35

The computer-readable recording medium according to any of Additional statements 31 to 34, wherein in the step for calculating said recognition degree, with respect to object information for which said recognition degree is to be calculated among said source information and acquired said each destination information and said each link, acquired are a total of frequencies of occurrence corresponding to said object information among a total of frequencies of occurrence of all of source information accumulated in said linkage information accumulation unit and a total of frequencies of occurrence of all of destination information accumulated in said linkage information accumulation unit and a total of frequencies of occurrence of all the links accumulated in said linkage information accumulation unit, and estimated is an appearance probability distribution from acquired said total of frequencies of occurrence, and calculated is an appearance probability of said object information as a recognition degree of said object information using said estimated appearance probability distribution.

Additional Statement 36

The computer-readable recording medium according to any of Additional statements 31 to 34, wherein in the step for calculating said recognition degree, with respect to object information for which said recognition degree is to be calculated among said source information, acquired said each destination information, and said each link, acquired are a total of frequencies of occurrence corresponding to said object information among a total of frequencies of occurrence of all of source information accumulated in said linkage information accumulation unit and a total of frequencies of occurrence of all of destination information accumulated in said linkage information accumulation unit and a total of frequencies of occurrence of all the links accumulated in said linkage information accumulation unit, and calculated is an average frequency of occurrence from acquired said total of frequencies of occurrence, and calculated is, as a recognition degree of said object information, a difference between said calculated average frequency of occurrence and the frequency of occurrence of said object information.

Additional Statement 37

The computer-readable recording medium according to any of Additional statements 31 to 36, wherein in the step for acquiring said each destination information and said each frequency of occurrence, further, acquired are category information of said source information and category information of linked said each destination information from said linkage information accumulation unit, and in the step for calculating said recognition degree, from a total of frequencies of occurrence of links between categories of said source information and said destination information corresponding to an object link which is said link of which a recognition degree is to be calculated, estimated is an appearance probability distribution, and using said estimated appearance probability distribution, calculated is, as a recognition degree of said object link, an appearance probability of a link between said categories.

Additional Statement 38

The computer-readable recording medium according to Additional statement 37, wherein in the step for calculating said recognition degree, in the case where at least one of said source information and said destination information which correspond to said object link belongs to a plurality of categories, an average value, the maximum or the minimum of said recognition degrees calculated with respect to each said category is made to be a recognition degree of said object link.

Additional Statement 39

The computer-readable recording medium according to any of Additional statements 31 to 38, wherein in the step for acquiring said each destination information and said each frequency of occurrence, further, acquired are category information of said source information and category information of linked said each destination information from said linkage information accumulation unit, and in the step for calculating said recognition degree, with respect to object information of which said recognition degree is to be calculated among said source information and acquired said each destination information, acquired are a total of frequencies of occurrence corresponding to said object information among a total of frequencies of occurrence of categories of all of source information accumulated in said linkage information accumulation unit, a total of frequencies of occurrence of categories of all of destination information accumulated in said linkage information accumulation unit, and a total of frequencies of occurrence of categories of all the links accumulated in said linkage information accumulation unit, and estimated is an appearance probability distribution from acquired said total of frequencies of occurrence, and calculated is an appearance probability of a category of said object information as a recognition degree of said object information using said estimated appearance probability distribution.

Additional Statement 40

The computer-readable recording medium according to any of Additional statements 31 to 38, wherein in the step for acquiring said each destination information and said each frequency of occurrence, further, acquired are category information of said source information and category information of linked said each destination information from said linkage information accumulation unit, and in the step for calculating said recognition degree, with respect to object information of which said recognition degree is to be calculated among said source information and acquired said each destination information, acquired are a total of frequencies of occurrence corresponding to said object information among a total of frequencies of occurrence of categories of all of source information accumulated in said linkage information accumulation unit, a total of frequencies of occurrence of categories of all of destination information accumulated in said linkage information accumulation unit, and a total of frequencies of occurrence of categories of all the links accumulated in said linkage information accumulation unit, and calculated is an average frequency of occurrence from acquired said total of frequencies of occurrence, and calculated is a difference between the calculated average frequency of occurrence and the frequency of occurrence of the category of said object information as a recognition degree of said object information.

Additional statement 41

The computer-readable recording medium according to Additional statements 39 or 40, wherein
in the step for calculating said recognition degree, in the case where said object information belongs to a plurality of categories, an average value, the maximum or the minimum of said recognition degree calculated with respect to each said category is made to be a recognition degree of said object information.

Additional Statement 42

The computer-readable recording medium according to any of Additional statements 31 to 41, wherein
in the step for acquiring said each destination information and said each frequency of occurrence, on receiving said source information, from said linkage information accumulation unit, acquired are a plurality of destination information linked with said source information, a relation content of said source information and each said destination information, a frequency of occurrence of said source information, and a frequency of occurrence of said each destination information, a frequency of occurrence of a link of said source information and said each destination information, and a frequency of occurrence of each said relation content, and
in the step for calculating said recognition degree, based on acquired each said frequency of occurrence, calculated are a recognition degree of said source information, a recognition degree of acquired said each destination information, a recognition degree of each said link, and a recognition degree of acquired said each relation content, and
in the step for selecting said destination information, based on a combination of two or more among a recognition degree of said source information, a recognition degree of said destination information, a recognition degree of said link and a recognition degree of said relation content, selected are one or more of said destination information from said each destination information, and outputted is at least selected said destination information.

Additional Statement 43

The computer-readable recording medium according to Additional statement 42, wherein
in the step for selecting said destination information, selected is, from among said each destination information, said destination information where a recognition degree of said source information, a recognition degree of said destination information, and a recognition degree of said link become higher than a prescribed threshold value, and a recognition degree of said relation content becomes lower than a prescribed threshold value, and selected is, from among said each destination information, said destination information where a recognition degree of said source information, a recognition degree of said destination information, and a recognition degree of said link become lower than a prescribed threshold value, and a recognition degree of said relation content becomes higher than a prescribed threshold value.

Additional Statement 44

The computer-readable recording medium according to Additional statement 43, wherein
in the step for selecting said destination information, further, selected is, from among said each destination information, said destination information where a recognition degree of said source information and a recognition degree of said destination information become higher than a prescribed threshold value, and at least one of a recognition degree of said link and a recognition degree of said relation content becomes lower than a prescribed threshold value, as destination information where unpredictability is high in a high level among said selected destination information, and
selected is, from among said each destination information, said destination information where a recognition degree of one of a recognition degree of said source information and said destination information becomes higher than a prescribed threshold value, and a recognition degree of the other becomes lower than a prescribed threshold value, and a recognition degree of said link becomes lower than a prescribed threshold value, and
from among selected said destination information, selected is destination information where a recognition degree of said source information and a recognition degree of said destination information become higher than a prescribed threshold value, and at least one of a recognition degree of said link and a recognition degree of said relation content becomes lower than a prescribed threshold value, as destination information where unpredictability is high in a high level among said selected destination information, and selected is said destination information where a recognition degree of one of a recognition degree of said source information and said destination information becomes higher than a prescribed threshold value, and a recognition degree of the other becomes lower than a prescribed threshold value, a recognition degree of said link becomes lower than a prescribed threshold value, and a recognition degree of said relation content becomes higher than a prescribed threshold value, as destination information where unpredictability is high in a middle level among selected said destination information.

Additional Statement 45

The computer-readable recording medium according to any of Additional statements 42 to 44, wherein
in the step for acquiring said each destination information and said each frequency of occurrence, further, acquired are category information of said source information and category information of linked said each destination information from said linkage information accumulation unit, and
in the step for calculating said recognition degree, with respect to links between categories of each of said source information and said each destination information which correspond to said relation content of which said recognition degree is to be calculated, calculated is an appearance probability of said relation content based on a total of frequencies of occurrence of links between said categories and frequencies of occurrence of said relation content, and said calculated appearance probability is made to be a recognition degree of said relation content.

Above-mentioned embodiments should be considered to an exemplification at all points, and not restrictive. The scope of the present invention is shown not by descriptions mentioned above but by the scope of the claims, and all modifications within meaning and scope equivalent to the claims are intended to be included therein. This application claims priority on the basis of Japanese Patent Application No. 2010-055699 applied on Mar. 12, 2010, and takes in here all the disclosures thereof.

INDUSTRIAL APPLICABILITY

The present invention can be used for a retrieval device of a relation object of position information and a keyword input auxiliary device in text retrieval or the like, and therefore, has industrial applicability.

DESCRIPTION OF SYMBOLS

51 Input unit
52 Linkage information retrieval unit
53 Recognition degree calculation unit
54 High interest information narrowing unit
55 Outputting unit
56 Linkage information accumulation unit
64 High interest information narrowing unit
66 Linkage information accumulation unit
101 CPU
102 Main memory
103 Hard disk
104 Input interface
105 Display controller
106 Data reader/writer
107 Communication interface
108 Keyboard
109 Mouse
110 Display
111 Recording medium
121 Bus
201 Linkage information output apparatus
301 Input unit
302 Position information retrieval unit
303 Linkage information narrowing unit
304 Outputting unit
305 Position information accumulation unit
306 Linkage information accumulation unit
401 Position information display apparatus

The invention claimed is:

1. A linkage information output apparatus for outputting information linked with source information, comprising a central processing unit (CPU) of a computer, the CPU having:
    an input unit to which source information is input;
    a linkage information retrieval unit which receives said source information, and acquires a plurality of destination information linked with said source information, a frequency of occurrence of said source information, a frequency of occurrence of linked each said destination information, and a frequency of occurrence of a link of said source information and said each destination information, from a linkage information accumulation unit provided inside or outside said linkage information output apparatus;
    a recognition degree calculation unit which, based on acquired each said frequency of occurrence, calculates a recognition degree of said source information, a recognition degree of acquired said each destination information, and a recognition degree of each said link, and determines whether the calculated said recognition degrees are high or low;
    a high interest information narrowing unit which selects one or more of said destination information from among said each destination information based on a combination of two or more among results of the determined highs and lows of the recognition degree of said source information, the recognition degree of said destination information and the recognition degree of said link; and
    an output unit that outputs at least selected said destination information,
    wherein said high interest information narrowing unit selects any two among said source information, said destination information, and said link, and selects, from among said each destination information, said destination information where a recognition degree of one of the selected ones becomes higher than a prescribed threshold value and a recognition degree of the other becomes lower than a prescribed threshold value, and
    wherein said high interest information narrowing unit selects, from among said each destination information, said destination information where at least one of a recognition degree of said source information and a recognition degree of said destination information becomes higher than a prescribed threshold value, and a recognition degree of said link becomes lower than a prescribed threshold value.

2. The linkage information output apparatus according to claim 1, wherein said high interest information narrowing unit, further, from among selected said destination information, selects destination information where a recognition degree of said source information and a recognition degree of said destination information become higher than a prescribed threshold value, and where a recognition degree of said link becomes lower than a prescribed threshold value, as destination information where unpredictability is high in a high level.

3. The linkage information output apparatus according to claim 1, wherein said recognition degree calculation unit, with respect to object information for which said recognition degree is to be calculated among said source information, acquired said each destination information and said each link, acquires a total of frequencies of occurrence corresponding to said object information among a total of frequencies of occurrence of all of source information accumulated in said linkage information accumulation unit and a total of frequencies of occurrence of all of destination information accumulated in said linkage information accumulation unit and a total of frequencies of occurrence of all the links accumulated in said linkage information accumulation unit, and estimates an appearance probability distribution from acquired said total of frequencies of occurrence, and calculates an appearance probability of said object information as a recognition degree of said object information using said estimated appearance probability distribution.

4. The linkage information output apparatus according to claim 1, wherein said recognition degree calculation unit, with respect to an object information where said recognition degree is to be calculated among said source information, acquired said each destination information, and said link, acquires a total of frequencies of occurrence corresponding to said object information among a total of frequencies of occurrence of all of source information accumulated in said linkage information accumulation unit and a total of frequencies of occurrence of all of destination information accumulated in said linkage information accumulation unit and a total of frequencies of occurrence of all the links accumulated in said linkage information accumulation unit, and calculates an average frequency of occurrence from acquired said total of frequencies of occurrence, and calculates, as a recognition degree of said object information, a difference between said calculated average frequency of occurrence and the frequency of occurrence of said object information.

5. The linkage information output apparatus according to claim 1, wherein said linkage information retrieval unit, further, acquires category information of said source information, and category information of linked said each destination information from said linkage information accumulation unit, and said recognition degree calculation unit, from a total of frequencies of occurrence of links between categories of said source information and said destination information corresponding to an object link which is said link of which said recognition degree is to be calculated, estimates an appearance probability distribution, and using said estimated appearance probability distribution, calculates an appearance probability of the link between said categories as a recognition degree of said object link.

6. The linkage information output apparatus according to claim 5, wherein said recognition degree calculation unit, in the case where at least one of said source information and said destination information which correspond to said object link belongs to a plurality of categories, an average value, the maximum or the minimum of said recognition degrees calculated with respect to each said category is made to be a recognition degree of said object link.

7. The linkage information output apparatus according to claim 1, wherein said linkage information retrieval unit, further, acquires category information of said source information, and category information of linked said each destination information from said linkage information accumulation unit, and said recognition degree calculation unit, with respect to object information of which said recognition degree is to be calculated among said source information and acquired said each destination information, acquires a total of frequencies of occurrence corresponding to said object information among a total of frequencies of occurrence of categories of all of source information accumulated in said linkage information accumulation unit, and a total of frequencies of occurrence of categories of all of destination information accumulated in said linkage information accumulation unit, and estimates an appearance probability distribution from acquired said total of frequencies of occurrence, and calculates an appearance probability of the category of said object information as a recognition degree of said object information using said estimated appearance probability distribution.

8. The linkage information output apparatus according to claim 7, wherein said recognition degree calculation unit, in the case where said object information belongs to a plurality of categories, an average value, the maximum or the minimum of said recognition degree calculated with respect to each said category is made to be a recognition degree of said object information.

9. The linkage information output apparatus according to claim 1, wherein said linkage information retrieval unit, further, acquires category information of said source information, and category information of linked said each destination information from said linkage information accumulation unit, and said recognition degree calculation unit, with respect to object information of which said recognition degree is to be calculated among said source information and acquired said each destination information, acquires a total of frequencies of occurrence corresponding to said object information among a total of frequencies of occurrence of categories of all of source information accumulated in said linkage information accumulation unit, and a total of frequencies of occurrence of categories of all of destination information accumulated in said linkage information accumulation unit, and calculates an average frequency of occurrence from acquired said total of frequencies of occurrence, and calculates a difference between the calculated average frequency of occurrence and the frequency of occurrence of the category of said object information as a recognition degree of said object information.

10. The linkage information output apparatus according to claim 1, wherein said linkage information retrieval unit, on receiving said source information, from said linkage information accumulation unit, acquires: a plurality of destination information linked with said source information; a relation content of said source information and each said destination information; a frequency of occurrence of said source information; a frequency of occurrence of said each destination information; a frequency of occurrence of a link of said source information and said each destination information; and a frequency of occurrence of each said relation content, and said recognition degree calculation unit, based on acquired each said frequency of occurrence, calculates: a recognition degree of said source information; a recognition degree of acquired said each destination information; a recognition degree of each said link; and a recognition degree of acquired said each relation content, and said high interest information narrowing unit, based on a combination of two or more among a recognition degree of said source information, a recognition degree of said destination information, a recognition degree of said link and a recognition degree of said relation content, selects one or more of said destination information from said each destination information, and outputs at least selected said destination information.

11. The linkage information output apparatus according to claim 10, wherein said high interest information narrowing unit selects, from among said each destination information, said destination information where a recognition degree of said source information, a recognition degree of said destination information, and a recognition degree of said link become higher than a prescribed threshold value, and a recognition degree of said relation content becomes lower than a prescribed threshold value, and selects, from among said each destination information, said destination information where a recognition degree of said source information, a recognition degree of said destination information, and a recognition degree of said link become lower than a prescribed threshold value, and a recognition degree of said relation content becomes higher than a prescribed threshold value.

12. The linkage information output apparatus according to claim 11, wherein said high interest information narrowing unit, further, selects, from among said each destination information, said destination information where a recognition degree of said source information and a recognition degree of said destination information become higher than a prescribed threshold value, and at least one of a recognition degree of said link and a recognition degree of said relation content becomes lower than a prescribed threshold value, and selects, from among said each destination information, said destination information where a recognition degree of one of said source information and said destination information become higher than a prescribed threshold value, and a recognition degree of the other becomes lower than a prescribed threshold value, and a recognition degree of said link becomes lower than a prescribed threshold value, and said high interest information narrowing unit, selects, from among selected said destination information, said destination information where a recognition degree of said source information and a recognition degree of said destination information become higher than a prescribed threshold value, and at least one of a recognition degree of said link and a recognition degree of said relation content becomes lower than a prescribed threshold value, as destination information where unpredictability is high in a high level among said selected destination information, and selects said destination information where a recognition degree of one of said source information and said destination information becomes higher than a prescribed threshold value, and a recognition degree of the other becomes lower than a prescribed threshold value, a recognition degree of said link becomes lower than a prescribed threshold value, and a recognition degree of said relation content becomes higher than a prescribed threshold value, as destination information where unpredictability is high in a middle level among selected said destination information.

13. The linkage information output apparatus according to claim 1, wherein said linkage information retrieval unit, further, acquires category information of said source information, and category information of linked said each destination information from said linkage information accumulation unit, and said recognition degree calculation unit, with respect to links between categories of each of said source information and said destination information which correspond to said relation content of which said recognition degree is to be calculated, calculates an appearance probability of said relation content based on a total of frequencies of occurrence of links between said categories and frequencies of occurrence of said relation content, and said calculated appearance probability is made to be a recognition degree of said relation content.

14. A linkage information output method in a linkage information output apparatus for outputting information linked with source information, the method comprising causing a computer processor to execute the steps of:

inputting source information;

acquiring, on receiving said source information, a plurality of destination information linked with said source information, a frequency of occurrence of said source information, a frequency of occurrence of linked each said destination information, and a frequency of occurrence of a link of said source information and said each destination information, from a linkage information accumulation unit provided inside or outside said linkage information output apparatus;

calculating, based on acquired each said frequency of occurrence, a recognition degree of said source information, a recognition degree of acquired said each destination information, a recognition degree of each said link;

determining whether the calculated said recognition degrees are high or low;

selecting one or more of said destination information from among said each destination information based on a combination of two or more among results of the determined highs and lows of the recognition degree of said source information, the recognition degree of said destination information and the recognition degree of said link; and outputting at least selected said destination information, wherein in the step for selecting said destination information, selected are any two among said source information, said destination information, and said link, and selected from among said each destination information is said destination information where a recognition degree of one of the selected ones becomes higher than a prescribed threshold value and a recognition degree of the other becomes lower than a prescribed threshold value, and wherein in the step for selecting said destination information, selected is, from among said each destination information, said destination information where at least one of a recognition degree of said source information or a recognition degree of said destination information becomes higher than a prescribed threshold value, and a recognition degree of said link becomes lower than a prescribed threshold value.

15. The linkage information output method according to claim 14, wherein in the step for selecting said destination information, further, from among selected said destination information, selected is destination information where a recognition degree of said source information and a recognition degree of said destination information become higher than a prescribed threshold value, and where a recognition degree of said link becomes lower than a prescribed threshold value, as destination information where unpredictability is high in a high level.

16. The linkage information output method according to claim 14, wherein in the step for calculating said recognition degree, with respect to object information for which said recognition degree is to be calculated among said source information and acquired said each destination information and said each link, acquired are a total of frequencies of occurrence corresponding to said object information among a total of frequencies of occurrence of all of source information accumulated in said linkage information accumulation unit and a total of frequencies of occurrence of all of destination information accumulated in said linkage information accumulation unit and a total of frequencies of occurrence of all the links accumulated in said linkage information accumulation unit, and estimated is an appearance probability distribution from acquired said total of frequencies of occurrence, and calculated is an appearance probability of said object information as a recognition degree of said object information using said estimated appearance probability distribution.

17. The linkage information output method according to claim 14, wherein in the step for calculating said recognition degree, with respect to an object information where said recognition degree is to be calculated among said source information, acquired said each destination information, and said link, acquired are a total of frequencies of occurrence corresponding to said object information among a total of frequencies of occurrence of all of source information accumulated in said linkage information accumulation unit and a total of frequencies of occurrence of all of destination information accumulated in said linkage information accumulation unit and a total of frequencies of occurrence of all the links accumulated in said linkage information accumulation unit, and calculated is an average frequency of occurrence from acquired said total of frequencies of occurrence, and calculated is, as a recognition degree of said object information, a difference between said calculated average frequency of occurrence and the frequency of occurrence of said object information.

18. The linkage information output method according to claim 14, wherein in the step for acquiring said each destination information and said each frequency of occurrence, further, acquired are category information of said source information and category information of linked said each destination information from said linkage information accumulation unit, and in the step for calculating said recognition degree, from a total of frequencies of occurrence of links between categories of said source information and said destination information corresponding to an object link which is said link of which a recognition degree is to be calculated, estimated is an appearance probability distribution, and using said estimated appearance probability distribution, calculated is, as a recognition degree of said object link, an appearance probability of a link between said categories.

19. The linkage information output method according to claim 18, wherein in the step for calculating said recognition degree, in the case where at least one of said source information and said destination information which correspond to said object link belongs to a plurality of categories, an average value, the maximum or the minimum of said recognition degrees calculated with respect to each said category is made to be a recognition degree of said object link.

20. The linkage information output method according to claim 14, wherein in the step for acquiring said each destination information and said each frequency of occurrence, further, acquired are category information of said source information and category information of linked said each destination information from said linkage information accumulation unit, and in the step for calculating said recognition degree, with respect to object information of which said recognition degree is to be calculated among said source information and acquired said each destination information, acquired are a total of frequencies of occurrence corresponding to said object information among a total of frequencies of occurrence of categories of all of source information accumulated in said linkage information accumulation unit, a total of frequencies of occurrence of categories of all of destination information accumulated in said linkage information accumulation unit, and a total of frequencies of occurrence of categories of all the links accumulated in said linkage information accumulation unit, and estimated is an appearance probability distribution from acquired said total of frequencies of occurrence, and calculated is an appearance probability of a category of said object information as a recognition degree of said object information using said estimated appearance probability distribution.

21. The linkage information output method according to claim 14, wherein in the step for acquiring said each destination information and said each frequency of occurrence, further, acquired are category information of said source information and category information of linked said each destination information from said linkage information accumulation unit, and in the step for calculating said recognition degree, with respect to object information of which said recognition degree is to be calculated among said source information and acquired said each destination information, acquired are a total of frequencies of occurrence corresponding to said object information among a total of frequencies of occurrence of categories of all of source information accumulated in said linkage information accumulation unit, a total of frequencies of occurrence of categories of all of destination information accumulated in said linkage information accumulation unit, and a total of frequencies of occurrence of categories of all the links accumulated in said linkage information accumulation unit, and calculated is an average frequency of occurrence from acquired said total of frequencies of occurrence, and calculated is a difference between the calculated average frequency of occurrence and the frequency of occurrence of the category of said object information as a recognition degree of said object information.

22. The linkage information output method according to claim 20, wherein in the step for calculating said recognition degree, in the case where said object information belongs to a plurality of categories, an average value, the maximum or the minimum of said recognition degree calculated with respect to each said category is made to be a recognition degree of said object information.

23. The linkage information output method according to claim 14, wherein in the step for acquiring said each destination information and said each frequency of occurrence, on receiving said source information, from said linkage information accumulation unit, acquired are a plurality of destination information linked with said source information, a relation content of said source information and each said destination information, a frequency of occurrence of said source information, and a frequency of occurrence of said each destination information, a frequency of occurrence of a link of said source information and said each destination information, and a frequency of occurrence of each said relation content, and in the step for calculating said recognition degree, based on acquired each said frequency of occurrence, calculated are a recognition degree of said source information, a recognition degree of acquired said each destination information, a recognition degree of each said link, and a recognition degree of acquired said each relation content, and in the step for selecting said destination information, based on a combination of two or more among a recognition degree of said source information, a recognition degree of said destination information, a recognition degree of said link and a recognition degree of said relation content, selected are one or more of said destination information from said each destination information, and outputted is at least selected said destination information.

24. The linkage information output method according to claim 23, wherein in the step for selecting said destination information, selected is, from among said each destination information, said destination information where a recognition degree of said source information, a recognition degree of said destination information, and a recognition degree of said link become higher than a prescribed threshold value, and a recognition degree of said relation content becomes lower than a prescribed threshold value, and selected is, from among said each destination information, said destination information where a recognition degree of said source information, a recognition degree of said destination information, and a recognition degree of said link become lower than a prescribed threshold value, and a recognition degree of said relation content becomes higher than a prescribed threshold value.

25. The linkage information output method according to claim 24, wherein
in the step for selecting said destination information, further, selected is, from among said each destination information, said destination information where a recognition degree of said source information and a recognition degree of said destination information become higher than a prescribed threshold value, and at least one of a recognition degree of said link and a recognition degree of said relation content becomes lower than a prescribed threshold value, as destination information where unpredictability is high in a high level among said selected destination information, and
selected is, from among said each destination information, said destination information where a recognition degree of one of a recognition degree of said source information and said destination information becomes higher than a prescribed threshold value, and a recognition degree of the other becomes lower than a prescribed threshold value, and a recognition degree of said link becomes lower than a prescribed threshold value, and
from among selected said destination information, selected is destination information where a recognition degree of said source information and a recognition degree of said destination information become higher than a prescribed threshold value, and at least one of a recognition degree of said link and a recognition degree of said relation content becomes lower than a prescribed threshold value, as destination information where unpredictability is high in a high level among said selected destination information, and selected is said destination information where a recognition degree of one of a recognition degree of said source information and said destination information becomes higher than a prescribed threshold value, and a recognition degree of the other becomes lower than a prescribed threshold value, a recognition degree of said link becomes lower than a prescribed threshold value, and a recognition degree of said relation content becomes higher than a prescribed threshold value, as destination information where unpredictability is high in a middle level among selected said destination information.

26. The linkage information output method according to claim 23, wherein
in the step for acquiring said each destination information and said each frequency of occurrence, further, acquired are category information of said source information and category information of linked said each destination information from said linkage information accumulation unit, and in the step for calculating said recognition degree, with respect to links between categories of each of said source information and said destination information which correspond to said relation content of which said recognition degree is to be calculated, calculated is an appearance probability of said relation content based on a total of frequencies of occurrence of links between said categories and frequencies of occurrence of said relation content, and said calculated appearance probability is made to be a recognition degree of said relation content.

27. A non-transitory computer-readable recording medium having a linkage information output program used in a linkage information output apparatus for outputting information linked with source information recorded, the linkage information output program making a computer execute the steps of:
inputting source information;
acquiring, on receiving said source information, a plurality of destination information linked with said source information, a frequency of occurrence of said source information, a frequency of occurrence of linked each said destination information, and a frequency of occurrence of a link of said source information and said each destination information, from a linkage information accumulation unit provided inside or outside said linkage information output apparatus;
calculating, based on acquired each said frequency of occurrence, a recognition degree of said source information, a recognition degree of acquired said each destination information, a recognition degree of each said link;
determining whether the calculated said recognition degrees are high or low;
selecting one or more of said destination information from among said each destination information based on a combination of two or more among results of the determined highs and lows of the recognition degree of said source information, the recognition degree of said destination information and the recognition degree of said link; and
outputting at least selected said destination information,
wherein in the step for selecting said destination information, selected are any two among said source information, said destination information, and said link, and selected from among said each destination information is said destination information where a recognition degree of one of the selected ones becomes higher than a prescribed threshold value and a recognition degree of the other becomes lower than a prescribed threshold value, and
wherein in the step for selecting said destination information, selected is, from among said each destination information, said destination information where at least one of a recognition degree of said source information or a recognition degree of said destination information becomes higher than a prescribed threshold value, and a recognition degree of said link becomes lower than a prescribed threshold value.

28. The computer-readable recording medium according to claim 27, wherein in the step for selecting said destination information, further, from among selected said destination information, selected is destination information where a recognition degree of said source information and a recognition degree of said destination information become higher than a prescribed threshold value, and where a recognition degree of said link becomes lower than a prescribed threshold value, as destination information where unpredictability is high in a high level.

29. The computer-readable recording medium according to claim 27, wherein in the step for calculating said recognition degree, with respect to object information for which said recognition degree is to be calculated among said source information and acquired said each destination information and said each link, acquired are a total of frequencies of occurrence corresponding to said object information among a total of frequencies of occurrence of all of source information accumulated in said linkage information accumulation unit and a total of frequencies of occurrence of all of destination information accumulated in said linkage information accumulation unit and a total of frequencies of occurrence of all the links accumulated in said linkage information accumulation unit, and estimated is an appearance probability distribution from acquired said total of frequencies of occurrence, and calculated is an appearance probability of said object information as a recognition degree of said object information using said estimated appearance probability distribution.

30. The computer-readable recording medium according to claim 27, wherein in the step for calculating said recognition degree, with respect to object information for which said recognition degree is to be calculated among said source information, acquired said each destination information, and said each link, acquired are a total of frequencies of occurrence corresponding to said object information among a total of frequencies of occurrence of all of source information accumulated in said linkage information accumulation unit and a total of frequencies of occurrence of all of destination information accumulated in said linkage information accumulation unit and a total of frequencies of occurrence of all the links accumulated in said linkage information accumulation unit, and calculated is an average frequency of occurrence from acquired said total of frequencies of occurrence, and calculated is, as a recognition degree of said object information, a difference between said calculated average frequency of occurrence and the frequency of occurrence of said object information.

31. The computer-readable recording medium according to claim 27, wherein
in the step for acquiring said each destination information and said each frequency of occurrence, further, acquired are category information of said source information and category information of linked said each destination information from said linkage information accumulation unit, and
in the step for calculating said recognition degree, from a total of frequencies of occurrence of links between categories of said source information and said destination information corresponding to an object link which is said link of which a recognition degree is to be calculated, estimated is an appearance probability distribution, and using said estimated appearance probability distribution, calculated is, as a recognition degree of said object link, an appearance probability of a link between said categories.

32. The computer-readable recording medium according to claim 31, wherein in the step for calculating said recognition degree, in the case where at least one of said source information and said destination information which correspond to said object link belongs to a plurality of categories, an average value, the maximum or the minimum of said recognition degrees calculated with respect to each said category is made to be a recognition degree of said object link.

33. The computer-readable recording medium according to claim 27, wherein
in the step for acquiring said each destination information and said each frequency of occurrence, further, acquired are category information of said source information and category information of linked said each destination information from said linkage information accumulation unit, and
in the step for calculating said recognition degree, with respect to object information of which said recognition degree is to be calculated among said source information and acquired said each destination information, acquired are a total of frequencies of occurrence corresponding to said object information among a total of frequencies of occurrence of categories of all of source information accumulated in said linkage information accumulation unit, a total of frequencies of occurrence of categories of all of destination information accumulated in said linkage information accumulation unit, and a total of frequencies of occurrence of categories of all the links accumulated in said linkage information accumulation unit, and estimated is an appearance probability distribution from acquired said total of frequencies of occurrence, and calculated is an appearance probability of a category of said object information as a recognition degree of said object information using said estimated appearance probability distribution.

34. The computer-readable recording medium according to claim 33, wherein in the step for calculating said recognition degree, in the case where said object information belongs to a plurality of categories, an average value, the maximum or the minimum of said recognition degree calculated with respect to each said category is made to be a recognition degree of said object information.

35. The computer-readable recording medium according to claim 27, wherein
in the step for acquiring said each destination information and said each frequency of occurrence, further, acquired are category information of said source information and category information of linked said each destination information from said linkage information accumulation unit, and
in the step for calculating said recognition degree, with respect to object information of which said recognition degree is to be calculated among said source information and acquired said each destination information, acquired are a total of frequencies of occurrence corresponding to said object information among a total of frequencies of occurrence of categories of all of source information accumulated in said linkage information accumulation unit, a total of frequencies of occurrence of categories of all of destination information accumulated in said linkage information accumulation unit, and a total of frequencies of occurrence of categories of all the links accumulated in said linkage information accumulation unit, and calculated is an average frequency of occurrence from acquired said total of frequencies of occurrence, and calculated is a difference between the calculated average frequency of occurrence and the frequency of occurrence of the category of said object information as a recognition degree of said object information.

36. The computer-readable recording medium according to claim 27, wherein
in the step for acquiring said each destination information and said each frequency of occurrence, on receiving said source information, from said linkage information accumulation unit, acquired are a plurality of destination information linked with said source information, a relation content of said source information and each said destination information, a frequency of occurrence of said source information, and a frequency of occurrence of said each destination information, a frequency of occurrence of a link of said source information and said each destination information, and a frequency of occurrence of each said relation content, and in the step for calculating said recognition degree, based on acquired each said frequency of occurrence, calculated are a recognition degree of said source information, a recognition degree of acquired said each destination information, a recognition degree of each said link, and a recognition degree of acquired said each relation content, and in the step for selecting said destination information, based on a combination of two or more among a recognition degree of said source information, a recognition degree of said destination information, a recognition degree of said link and a recognition degree of said relation content, selected are one or more of said destination information from said each destination information, and outputted is at least selected said destination information.

37. The computer-readable recording medium according to claim 36, wherein in the step for selecting said destination information, selected is, from among said each destination information, said destination information where a recognition degree of said source information, a recognition degree of said destination information, and a recognition degree of said link become higher than a prescribed threshold value, and a recognition degree of said relation content becomes lower than a prescribed threshold value, and selected is, from among said each destination information, said destination information where a recognition degree of said source information, a recognition degree of said destination information, and a recognition degree of said link become lower than a prescribed threshold value, and a recognition degree of said relation content becomes higher than a prescribed threshold value.

38. The computer-readable recording medium according to claim 37, wherein
in the step for selecting said destination information, further, selected is, from among said each destination information, said destination information where a recognition degree of said source information and a recognition degree of said destination information become higher than a prescribed threshold value, and at least one of a recognition degree of said link and a recognition degree of said relation content becomes lower than a prescribed threshold value, as destination information where unpredictability is high in a high level among said selected destination information, and selected is, from among said each destination information, said destination information where a recognition degree of one of a recognition degree of said source information and said destination information becomes higher than a prescribed threshold value, and a recognition degree of the other becomes lower than a prescribed threshold value, and a recognition degree of said link becomes lower than a prescribed threshold value, and from among selected said destination information, selected is destination information where a recognition degree of said source information and a recognition degree of said destination information become higher than a prescribed threshold value, and at least one of a recognition degree of said link and a recognition degree of said relation content becomes lower than a prescribed threshold value, as destination information where unpredictability is high in a high level among said selected destination information, and selected is said destination information where a recognition degree of one of a recognition degree of said source information and said destination information becomes higher than a prescribed threshold value, and a recognition degree of the other becomes lower than a prescribed threshold value, a recognition degree of said link becomes lower than a prescribed threshold value, and a recognition degree of said relation content becomes higher than a prescribed threshold value, as destination information where unpredictability is high in a middle level among selected said destination information.

39. The computer-readable recording medium according to claim 36, wherein
in the step for acquiring said each destination information and said each frequency of occurrence, further, acquired are category information of said source information and category information of linked said each destination information from said linkage information accumulation unit, and in the step for calculating said recognition degree, with respect to links between categories of each of said source information and said destination information which correspond to said relation content of which said recognition degree is to be calculated, calculated is an appearance probability of said relation content based on a total of frequencies of occurrence of links between said categories and frequencies of occurrence of said relation content, and said calculated appearance probability is made to be a recognition degree of said relation content.

* * * * *